US012587268B2

(12) United States Patent
Beale et al.

(10) Patent No.: US 12,587,268 B2
(45) Date of Patent: Mar. 24, 2026

(54) METHODS, COMMUNICATIONS DEVICE AND BASE STATION FOR A NON-TERRESTRIAL NETWORK

(71) Applicant: Sony Group Corporation, Tokyo (JP)

(72) Inventors: Martin Warwick Beale, Basingstoke (GB); Shin Horng Wong, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 313 days.

(21) Appl. No.: 18/271,057

(22) PCT Filed: Jan. 7, 2022

(86) PCT No.: PCT/EP2022/050231
§ 371 (c)(1),
(2) Date: Jul. 6, 2023

(87) PCT Pub. No.: WO2022/152620
PCT Pub. Date: Jul. 21, 2022

(65) Prior Publication Data
US 2024/0014890 A1     Jan. 11, 2024

(30) Foreign Application Priority Data
Jan. 15, 2021     (EP) .................................... 21151944

(51) Int. Cl.
*H04B 7/185*     (2006.01)

(52) U.S. Cl.
CPC ..... *H04B 7/18513* (2013.01); *H04B 7/18519* (2013.01)

(58) Field of Classification Search
CPC ........................ H04B 7/18513; H04B 7/18519
See application file for complete search history.

(56) References Cited

U.S. PATENT DOCUMENTS

| | | | |
|---|---|---|---|
| 2010/0246499 A1* | 9/2010 | Kim .................. | H04W 74/0833 370/329 |
| 2013/0316716 A1* | 11/2013 | Tapia .................... | H04W 72/51 455/450 |

(Continued)

FOREIGN PATENT DOCUMENTS

| | | |
|---|---|---|
| WO | 2020/071698 A1 | 4/2020 |
| WO | 2020/101558 A1 | 5/2020 |

OTHER PUBLICATIONS

International Search Report and Written Opinion mailed on Apr. 8, 2022, received for PCT Application PCT/EP2022/050231, filed on Jan. 7, 2022, 17 pages.

(Continued)

*Primary Examiner* — Vivek Srivastava
(74) *Attorney, Agent, or Firm* — XSENSUS LLP

(57) ABSTRACT

There is provided a method of operating a terminal in a mobile telecommunications system comprising a Non-Terrestrial Network "NTN", the network comprising a base station and the terminal, the terminal being configured to communicate with the base station via an air interface provided by infrastructure equipment of the NTN. The (Continued)

method comprises receiving a downlink transmission from the base station; in response to the downlink transmission, transmitting an uplink transmission to the base station; based on the uplink transmission and on a round trip time, determining whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

19 Claims, 10 Drawing Sheets

(56)                References Cited

U.S. PATENT DOCUMENTS

| | | | | |
|---|---|---|---|---|
| 2014/0242946 A1* | 8/2014 | Wu | ..................... | H04W 12/041 |
| | | | | 455/410 |
| 2014/0301360 A1* | 10/2014 | Bontu | .............. | H04W 36/0061 |
| | | | | 370/331 |
| 2022/0007455 A1 | 1/2022 | Hong | | |
| 2024/0095656 A1* | 3/2024 | Brown | ............. | G06Q 10/08355 |

OTHER PUBLICATIONS

3GPP, "Study on New Radio (NR) to support non terrestrial networks (Release 15)", 3GPP TR 38.811 V0.3.0, Dec. 2017, pp. 1-56.

3GPP, "Solutions for NR to support non-terrestrial networks (NTN) (Release 16)", 3GPP TR 38.821 V16.0.0, Dec. 2019, pp. 1-140.

Ericsson, "On scheduling, HARO, and DRX for NTNs", 3GPP TSG-RAN WG2 #113-e, R2-2101493, Jan. 25, 2021-Feb. 5, 2021, 18 pages.

Nokia et al., "Timing Advance, Random Access and DRX aspects in NTN", 3GPP TSG-RAN WG2 Meeting #111 Electronic, R2-2007590, Aug. 17-28, 2020, 9 pages.

Mediatek et al., "UL Time and Frequency Synchronisation for NR-NTN", 3GPP TSG RAN WG1 Meeting #102e, R1-2005496, Aug. 24-28, 2020, 14 pages.

Mediatek Inc., "New Study WID on NB-IoT/eTMC support for NTN", 3GPP TSG RAN Meeting #86, RP-193235, Dec. 9-31, 2019, 4 pages.

Mediatek et al., "UL Synchronization with Satellite Position and Velocity Broadcast on SIB", IoT NTN eWorkshop, Sep. 28, 2020, pp. 1-17.

Holma et al., "LTE for UMTS OFDMA and SC-FDMA Based Radio Access", John Wiley & Sons, 2009, 232 pages.

* cited by examiner

METHODS, COMMUNICATIONS DEVICE AND BASE STATION FOR A NON-TERRESTRIAL NETWORK

CROSS-REFERENCE TO RELATED APPLICATIONS

The present application is based on PCT filing PCT/EP2022/050231, filed 7 Jan. 2022, which claims the Paris Convention priority of European patent application EP21151944.2, filed 15 Jan. 2021, the contents of each of which are hereby incorporated by reference.

BACKGROUND

Field

The present disclosure relates generally to communications devices, base stations, infrastructure equipment and methods of operating communications devices, base stations and infrastructure equipment, and specifically to providing information regarding non-terrestrial infrastructure of a non-Terrestrial Network, NTN, to a communications device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the third generation partnership project (3GPP) defined UMTS and Long Term Evolution (LTE) architectures, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example, it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles. There is similarly expected to be a desire for such connectivity to be available over a wide geographic area.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1]. Other NTN relevant discussions are also provided in TR 38.821 [3].

Non-terrestrial networks may provide service in areas that cannot be covered by terrestrial cellular networks (i.e. those where coverage is provided by means of land-based antennas), such as isolated or remote areas, on board aircraft or vessels, or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY

The invention is defined in the appended independent claims. The present disclosure includes example arrangements falling within the scope of the claims (and other arrangements may also be within the scope of the following claims) and may also include example arrangements that do not necessarily fall within the scope of the claims but which are then useful to understand the invention and the teachings and techniques provided herein.

According to a first aspect of the present disclosure, there is provided a method of operating a terminal in a mobile telecommunications system comprising a Non-Terrestrial Network "NTN", the network comprising a base station and the terminal, the terminal being configured to communicate with the base station via an air interface provided by infrastructure equipment of the NTN, the method comprising: receiving a downlink transmission from the base station; in response to the downlink transmission, transmitting an uplink transmission to the base station; and based on the uplink transmission and on a round trip time, determining whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a second aspect of the present disclosure, there is provided a method of operating a base station in a mobile telecommunications system comprising a Non-Terrestrial Network "NTN", the network comprising the base station and a terminal configured to communicate with the base station via an air interface provided by infrastructure equipment of the NTN, the method comprising: transmitting a downlink transmission to the terminal; receiving, in response to the downlink transmission, an uplink transmission from the terminal; and making a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a third aspect of the present disclosure, there is provided a terminal for use in a mobile telecommunications system comprising a Non-Terrestrial Network "NTN", the network comprising a base station and the terminal, the terminal being configured to communicate with the base station via an air interface provided by infrastructure equipment of the NTN, and being further configured to: receive a downlink transmission from the base station; in response to the downlink transmission, transmit an uplink transmission to the base station; and based on the uplink transmission and on a round trip time, determine whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a fourth aspect of the present disclosure, there is provided circuitry for a terminal for use in a mobile telecommunications system comprising a Non-Terrestrial Network "NTN", the network comprising a base station and the terminal, wherein the circuitry comprises a controller element and a transceiver element configured to operate together to connect to the base station via an air interface provided by infrastructure equipment of the NTN, wherein the controller element and the transceiver element are further configured to operate together to: receive a downlink transmission from the base station; in response to the downlink transmission, transmit an uplink transmission to the base station; and based on the uplink transmission and on a round trip time, determine whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a fifth aspect of the present disclosure, there is provided a base station for use in a mobile telecommunications system comprising a Non-Terrestrial Network "NTN", the network comprising the base station and a terminal configured to communicate with the base station via an air interface provided by infrastructure equipment of the NTN, the base station being configured to: transmit a downlink transmission to the terminal; receive, in response to the downlink transmission, an uplink transmission from the terminal; and make a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a sixth aspect of the present disclosure, there is provided circuitry for a base station for use in a mobile telecommunications system comprising a Non-Terrestrial Network "NTN", the network comprising the base station and a terminal, wherein the circuitry comprises a controller element and a transceiver element configured to operate together to connect to the terminal via an air interface provided by infrastructure equipment of the NTN, wherein the controller element and the transceiver element are further configured to operate together to transmit a downlink transmission to the terminal; receive, in response to the downlink transmission, an uplink transmission from the terminal; and make a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

According to a seventh aspect of the present disclosure, there is provided a system for use in a Non-Terrestrial Network "NTN", the system comprising a base station and a terminal configured to communicate with the base station via an air interface provided by infrastructure equipment of the NTN, wherein the base station is configured in accordance with the fifth aspect and wherein the terminal is configured is configured in accordance with the third aspect.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
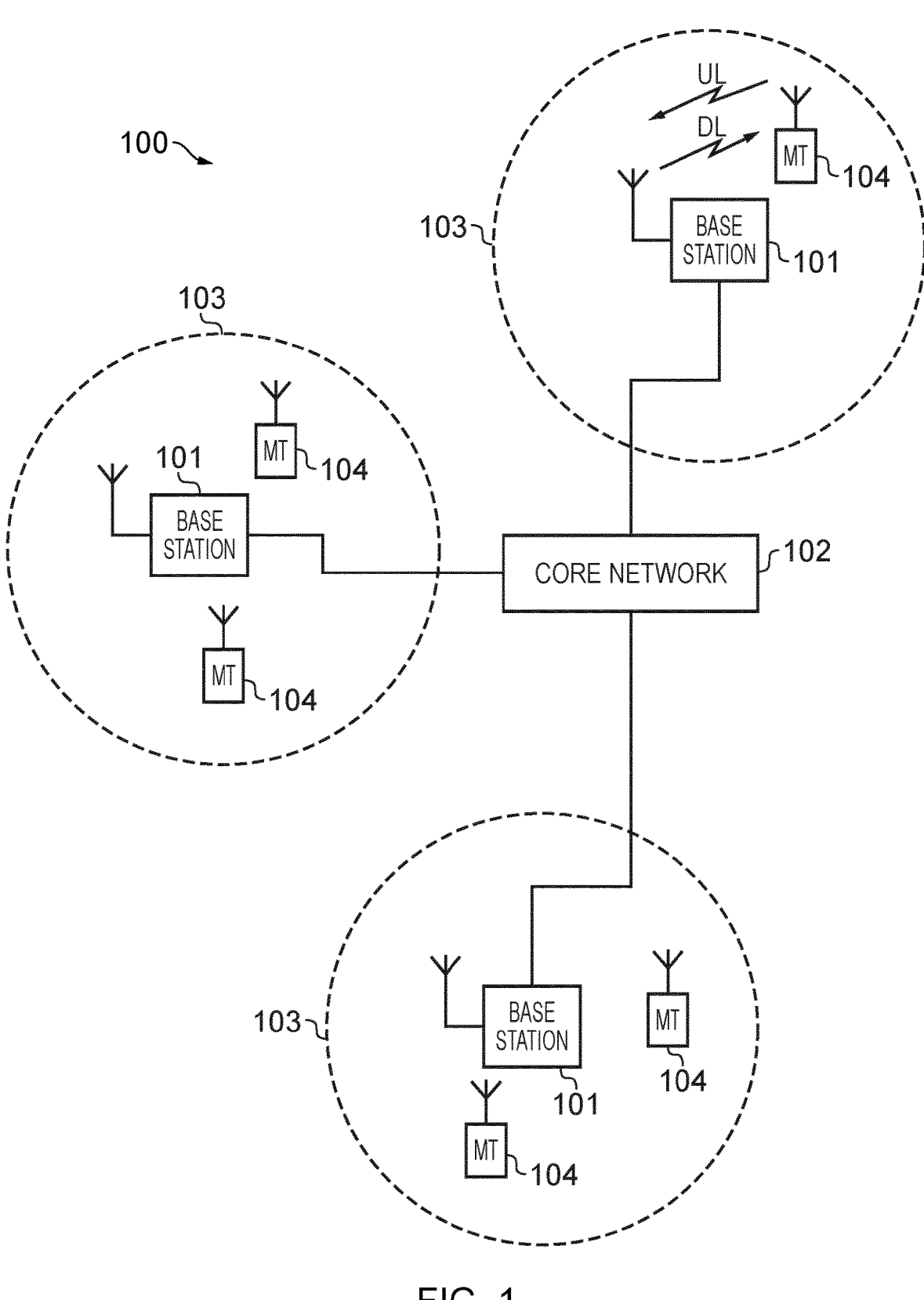
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs (eNB), g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity, certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
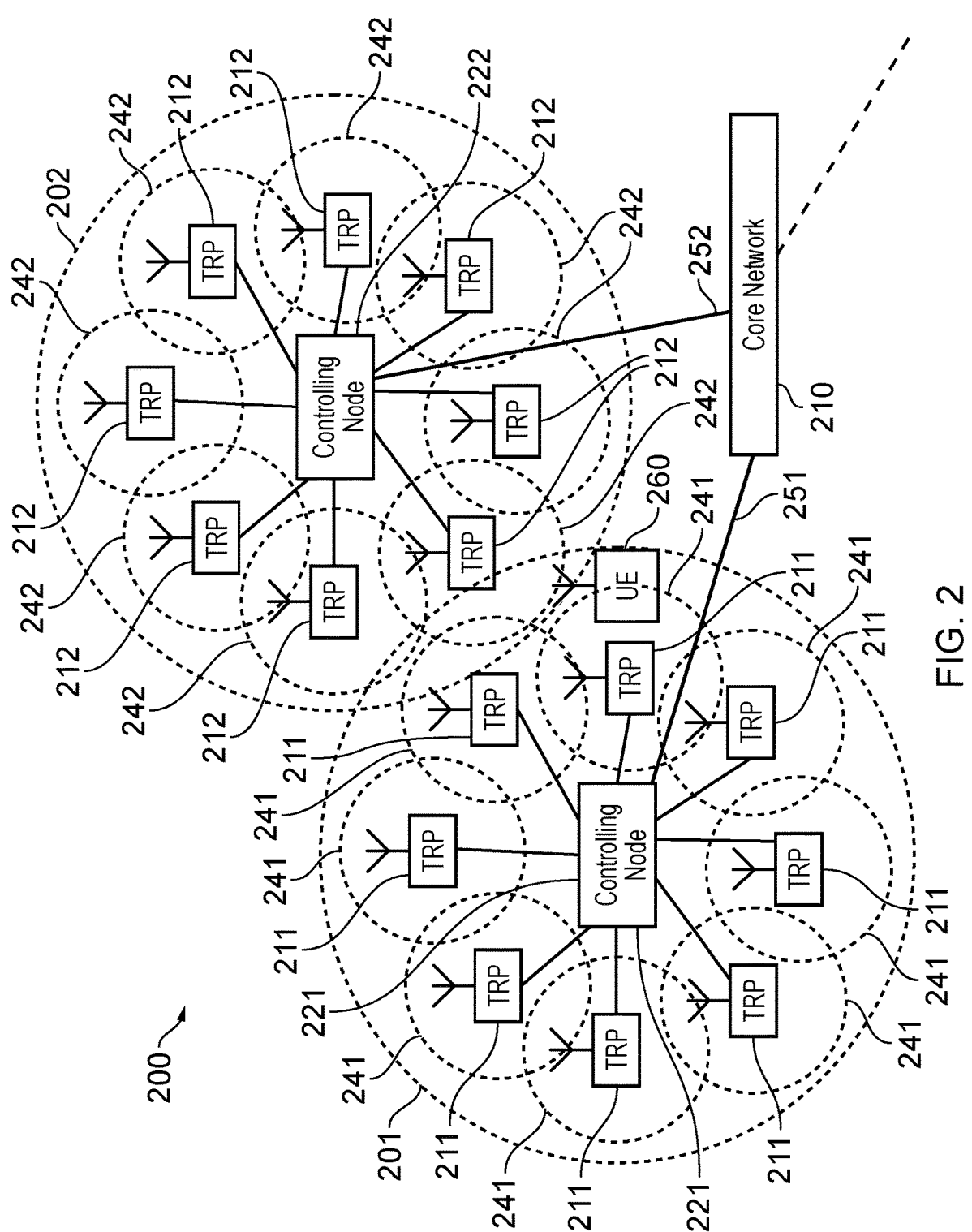
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
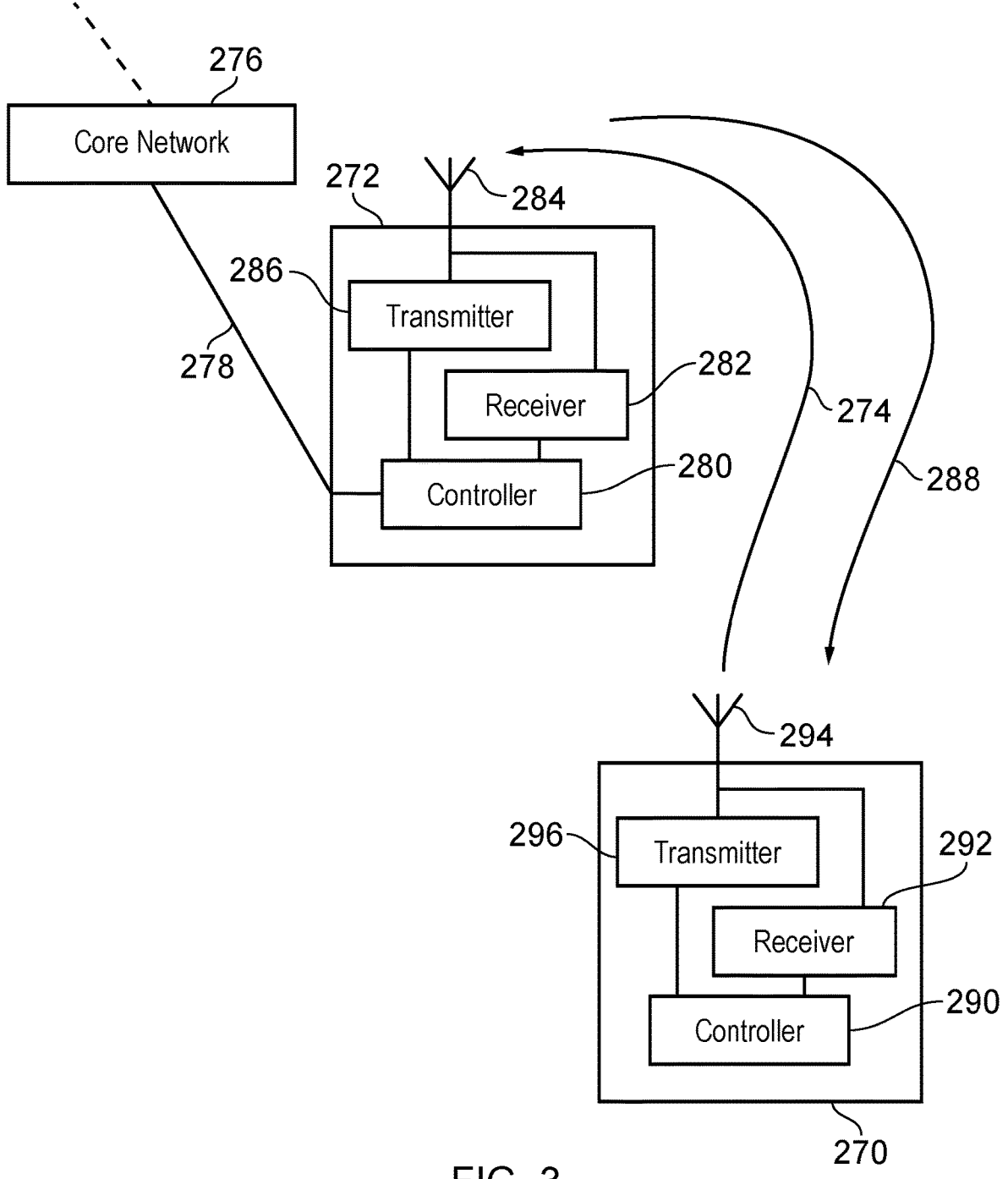
FIG. 3 is a schematic block diagram of an example infrastructure equipment and communications device configured in accordance with example embodiments.

A more detailed illustration of a communications device 270 and an example network infrastructure equipment 272, which may be thought of as an eNB or a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Non-Terrestrial Networks (NTNs)

Figure 4:
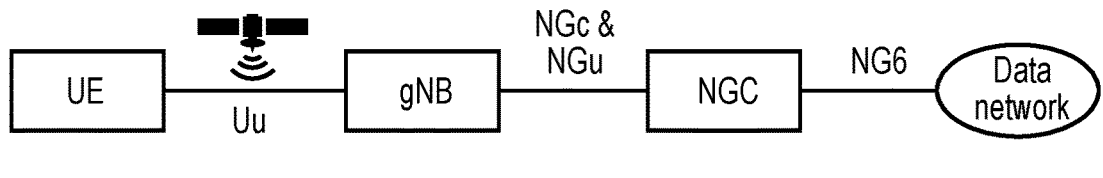
FIG. 4 is reproduced from [1], and illustrates a first example of a non-terrestrial network (NTN) based on a satellite/aerial platform with a bent pipe payload.
Figure 5:
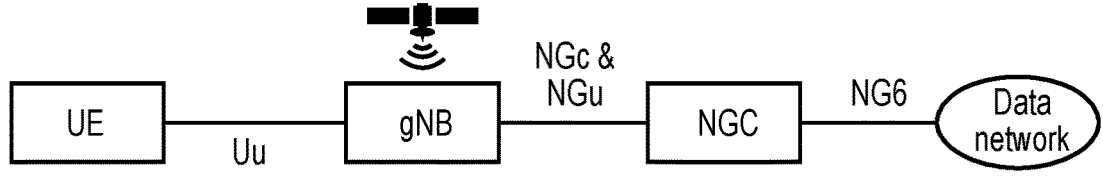
FIG. 5 is reproduced from [1], and illustrates a second example of an NTN based on a satellite/aerial platform co-located with a gNodeB.

An overview of NR-NTN can be found in [1], and much of the following wording, along with FIGS. 4 and 5, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and underserved areas (e.g. sub-urban/rural areas) to upgrade the performance of limited terrestrial networks in a cost effective manner;

reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive. It should also be noted that the same NTN benefits apply to 4G and/or LTE technologies and that while NR is sometimes referred to in the present disclosure, the teachings and techniques presented herein are equally applicable to 4G and/or LTE.

FIG. 4 illustrates a first example of an NTN architecture based on a satellite/aerial platform with a bent pipe payload, meaning that the same data is sent back down to Earth as is received by the satellite/aerial platform, with only frequency or amplification changing; i.e. acting like a pipe with a u-bend. In this example NTN, the satellite or the aerial platform will therefore relay a NR signal between the gNodeB (or eNodeB) and UEs in a transparent manner.

FIG. 5 illustrates a second example of an NTN architecture based on a satellite/aerial platform comprising a gNodeB (or eNodeB in the examples of this disclosure). In this example NTN, the satellite or aerial platform carries a full or part of a gNodeB to generate or receive a NR signal to/from the UEs. This requires the satellite or aerial platform to have sufficient on-board processing capabilities to be able to include a gNodeB or eNodeB functionality.

Figure 6:
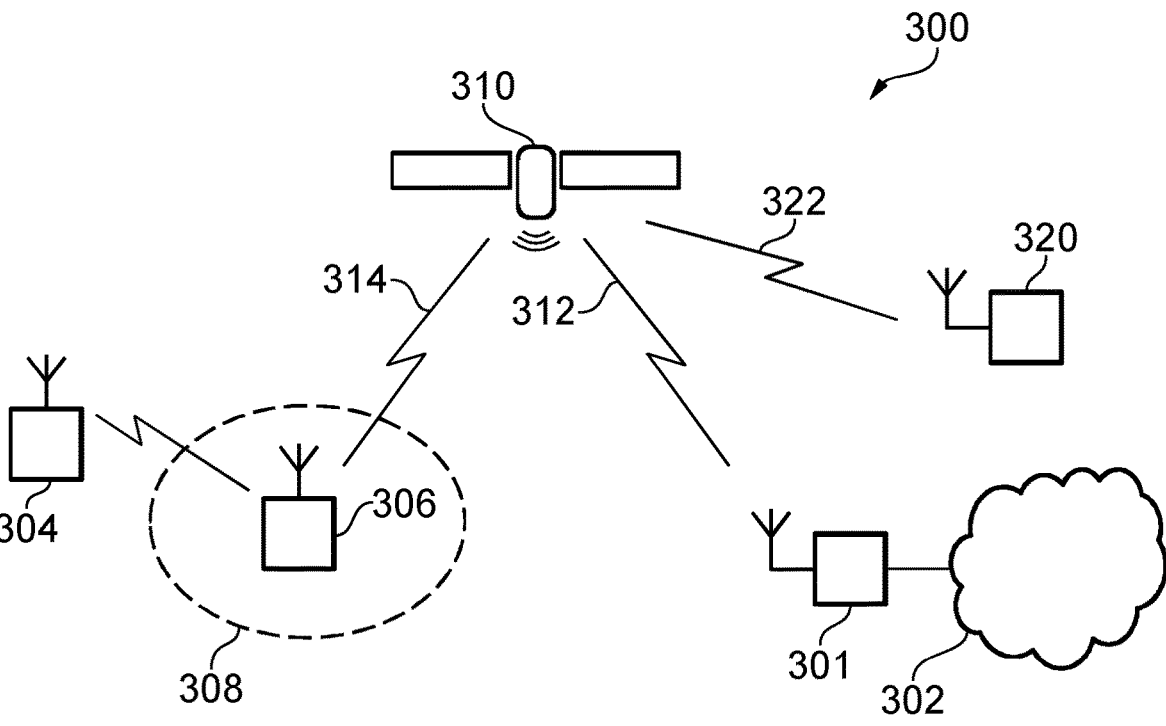
FIG. 6 schematically shows an example of a wireless communications system comprising an NTN part and a terrestrial network (TN) part which may be configured to operate in accordance with embodiments of the present disclosure.

FIG. 6 schematically shows an example of a wireless communications system 300 which may be configured to operate in accordance with embodiments of the present disclosure. The wireless communications system 300 in this example is based broadly around an LTE-type or 5G-type architecture. Many aspects of the operation of the wireless communications system/network 300 are known and understood and are not described here in detail in the interest of brevity. Operational aspects of the wireless communications system 300 which are not specifically described herein may be implemented in accordance with any known techniques, for example according to the current LTE-standards or the proposed 5G standards.

The wireless communications system 300 comprises a core network part 302 (which may be a 4G core network or a 5G core network) in communicative connection with a radio network part. The radio network part comprises a terrestrial station 301 connected to a non-terrestrial network part 310. The non-terrestrial network part 310 may be an example of infrastructure equipment. Alternatively, or in addition, the non-terrestrial network part 310 may be mounted on a satellite vehicle or on an airborne vehicle. In some cases, the base station (e.g. g-Node B/e-node B) may be fully implemented in the terrestrial station 301 or in the non-terrestrial network part 310, or may be partially implemented in one or both of the terrestrial station 301 or in the non-terrestrial network part 310.

The non-terrestrial network part 310 may communicate with a communications device 306, located within a cell 308, by means of a wireless access interface provided by a wireless communications link 314. For example, the cell 308 may correspond to the coverage area of a spot beam generated by the non-terrestrial network part 310. The boundary of the cell 308 may depend on an altitude of the non-terrestrial network part 310 and a configuration of one or more antennas of the non-terrestrial network part 310 by which the non-terrestrial network part 310 transmits and receives signals on the wireless access interface.

The non-terrestrial network part 310 may be a satellite in an orbit with respect to the Earth, or may be mounted on such a satellite. For example, the satellite may be in a geo-stationary earth orbit (GEO) such that the non-terrestrial network part 310 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 310 may complete an orbit of the Earth relatively quickly, thus providing moving cell coverage. Alternatively, the satellite may be in a non-geostationary orbit (NGSO), so that the non-terrestrial network part 310 moves with respect to a fixed point on the Earth's surface. The non-terrestrial network part 310 may be an airborne vehicle such as an aircraft, or may be mounted on such a vehicle. The airborne vehicle (and hence the non-terrestrial network part 310) may be stationary with respect to the surface of the Earth or may move with respect to the surface of the Earth.

In FIG. 6, the terrestrial station 301 is shown as ground-based, and connected to the non-terrestrial network part 310 by means of a wireless communications link 312. The non-terrestrial network part 310 receives signals representing downlink data transmitted by the terrestrial station 301 on the wireless communications link 312 and, based on the received signals, transmits signals representing the downlink data via the wireless communications link 314 providing the wireless access interface for the communications device 306. Similarly, the non-terrestrial network part 310 receives signals representing uplink data transmitted by the communications device 306 via the wireless access interface comprising the wireless communications link 314 and transmits signals representing the uplink data to the terrestrial station 301 on the wireless communications link 312. The wireless communications links 312, 314 may operate at a same frequency, or may operate at different frequencies The extent to which the non-terrestrial network part 310 processes the received signals may depend upon a processing capability of the non-terrestrial network part 310. For example, the non-terrestrial network part 310 may receive signals representing the downlink data on the wireless communication link 312, amplify them and (if needed) re-modulate onto an appropriate carrier frequency for onwards transmission on the wireless access interface provided by the wireless communications link 314. Alternatively, the non-terrestrial network part 310 may be configured to decode the signals representing the downlink data received on the wireless communication link 312 into un-encoded downlink data, re-encode the downlink data and modulate the encoded downlink data onto the appropriate carrier frequency for onwards transmission on the wireless access interface provided by the wireless communications link 314.

The non-terrestrial network part 310 may be configured to perform some of the functionality conventionally carried out by the base station. In particular, latency-sensitive functionality (such as acknowledging a receipt of the uplink data, or responding to a RACH request) may be performed by the non-terrestrial network part 310 partially implementing some of the functions of the base station.

As mentioned above, the base station may be co-located with the non-terrestrial network part 310; for example, both may be mounted on the same satellite vehicle or airborne vehicle, and there may be a physical (e.g. wired, or fibre optic) connection on board the satellite vehicle or airborne vehicle, providing the coupling between the base station and the non-terrestrial network part 310. In such co-located arrangements, a wireless communications feeder link between the base station and a terrestrial station 301 may provide connectivity between the base station (co-located with the non-terrestrial network part 310) and the core network part 302.

In some cases, the communications device 306 shown in FIG. 6 may be configured to act as a relay node. That is, it may provide connectivity to one or more terminal devices such as the terminal device 304. When acting as a relay node, the communications device 306 transmits and receives data to and from the terminal device 304, and relays it, via the non-terrestrial network part 310 to the terrestrial station 301. The communications device 306, acting as a relay node, may thus provide connectivity to the core network part 302 for terminal devices which are within a transmission range of the communications device 306.

In some cases, the non-terrestrial network part 310 is also connected to a ground station 320 via a wireless link 322. The ground station may for example be operated by the satellite operator (which may be the same as the mobile operator for the core and/or radio network or may be a different operator) and the link 322 may be used as a management link and/or to exchange control information. In some cases, once the non-terrestrial network part 310 has identified its current position and velocity, it can send position and velocity information to the ground station 320. The position and velocity information may be shared as appropriate, e.g. with one or more of the UE 306, terrestrial station 301 and base station, for configuring the wireless communication accordingly (e.g. via links 312 and/or 314).

It will be apparent to those skilled in the art that many scenarios can be envisaged in which the combination of the communications device 306 and the non-terrestrial network part 310 can provide enhanced service to end users. For example, the communications device 306 may be mounted on a passenger vehicle such as a bus or train which travels through rural areas where coverage by terrestrial base stations may be limited. Terminal devices on the vehicle may obtain service via the communications device 306 acting as a relay, which communicates with the non-terrestrial network part 310.

The distance between the UE and the eNB in an NTN deployment is significantly larger than that in a terrestrial cellular network. For example a Low Earth Orbit "LEO" satellite can be between 600 km to 1200 km away from the UE. Hence, the propagation delay between the UE and the eNB is significantly larger, especially in an NTN deployment using a transparent satellite where the Round Trip Time "RTT" will be twice as long compared to a case where the base station is co-located with the non-terrestrial network part. For example, in an NTN using a transparent LEO satellite, the RTT (Round Trip Time) between the UE and eNB can be 8 ms to 25.77 ms [3]. For a GEO satellite, the RTT can be hundreds of ms, e.g. 541 ms. In order to take into account this large propagation delay, uplink transmissions would need to apply a large Timing Advance and the eNB would need to take this into account for scheduling of uplink data. The timing advance that needs to be applied depends on the location of the UE within the cell footprint of the satellite. Since the cell footprint can be large, there can be a large variation of the timing advance that needs to be applied, depending on the UE location within the cell footprint.

Additionally, the NTN system also needs to take into account the movement of the satellite. For example, a LEO satellite can be travelling at 7.56 km/second (27,216 km/h) relative to the UE [3], which can cause a significant Doppler shift that the UE needs to compensate for. In order to factor in the Doppler shift, i.e. pre-compensation for frequency shift for UL transmissions, the UE needs to know its own geo-location and the position and velocity of the satellite.

The geo-location of the UE can be obtained from GNSS (Global Navigation Satellite System). It is usually assumed that a UE capable of supporting NTN has GNSS capability [3] or is able to use any other system for determining its location (e.g. absolute location or relative location with respect to the satellite).

Accordingly, particular challenges can be faced with non-terrestrial deployments. In many cases, it is preferred that, for NTN, closed-loop procedures can take into account the increased round trip time (RTT) from the terminal to the eNB. For example, in such procedures, the network or terminal can initiate a hand-shaking or hand-shaking like procedure with the terminal or network (respectively) and each expects the other to respond within a given time period and typically in a given time window. For example, an access procedure (e.g. RACH procedure) is such a procedure, which can be used by the terminal once uplink synchronisation is acquired. For NTN systems, the terminal may first use relatively less accurate values for the frequency compensation and timing advance before initiating an access procedure. The terminal may use more accurate values after the random access has been initiated—for example using a more accurate timing advance signalled to the UE by the base station. While some of the discussions have been focusing on how to cope with longer RTT which may otherwise cause standard procedures to have a higher failure rate, there are other challenges associated with NTN systems.

When considering NTN systems for machine-type communications, such as NB-IoT, MTC and/or eMTC, further challenges can be faced as the devices may have limited transmission power and/or battery power and/or battery charge. Reference [4] is a 3GPP IoT-NTN Work Item document which aim at defining features relating to satellite connectivity for NB-IoT and eMTC devices and may be of interest to the skilled reader.

For a GEO satellite, many repetitions may be required in the uplink and downlink to ensure successful transmission of a packet. The large number of repetitions may be required due to the high pathloss between the UE and satellite. The high pathloss reduces the Signal-to-Noise Ratio (SNR) and long transmissions in time (through repetitions) are required in order to ensure that the packet arrives with an amount of energy that is sufficient for successful decoding. For eMTC, approximately 256 repetitions may be required in order to transmit a packet. Such a transmission is expected to take 256 ms.

Many IoT devices have limited capabilities in terms of power consumption and particularly in terms of battery lifetime. Accordingly, power saving measures to conserve power at the terminal can be greatly beneficial.

When there is a large round trip time (RTT), the transmission of data takes longer, where the transmission of data involves exchanges of packets in both the downlink and uplink. The energy required to communicate data depends on the length of time taken to transmit the data (and any power saving techniques that can be applied). Since the large RTT associated with IoT NTN extends the time required to communicate data, the power consumption in the IoT NTN device is expected to increase as well.

Figures 7, 8:
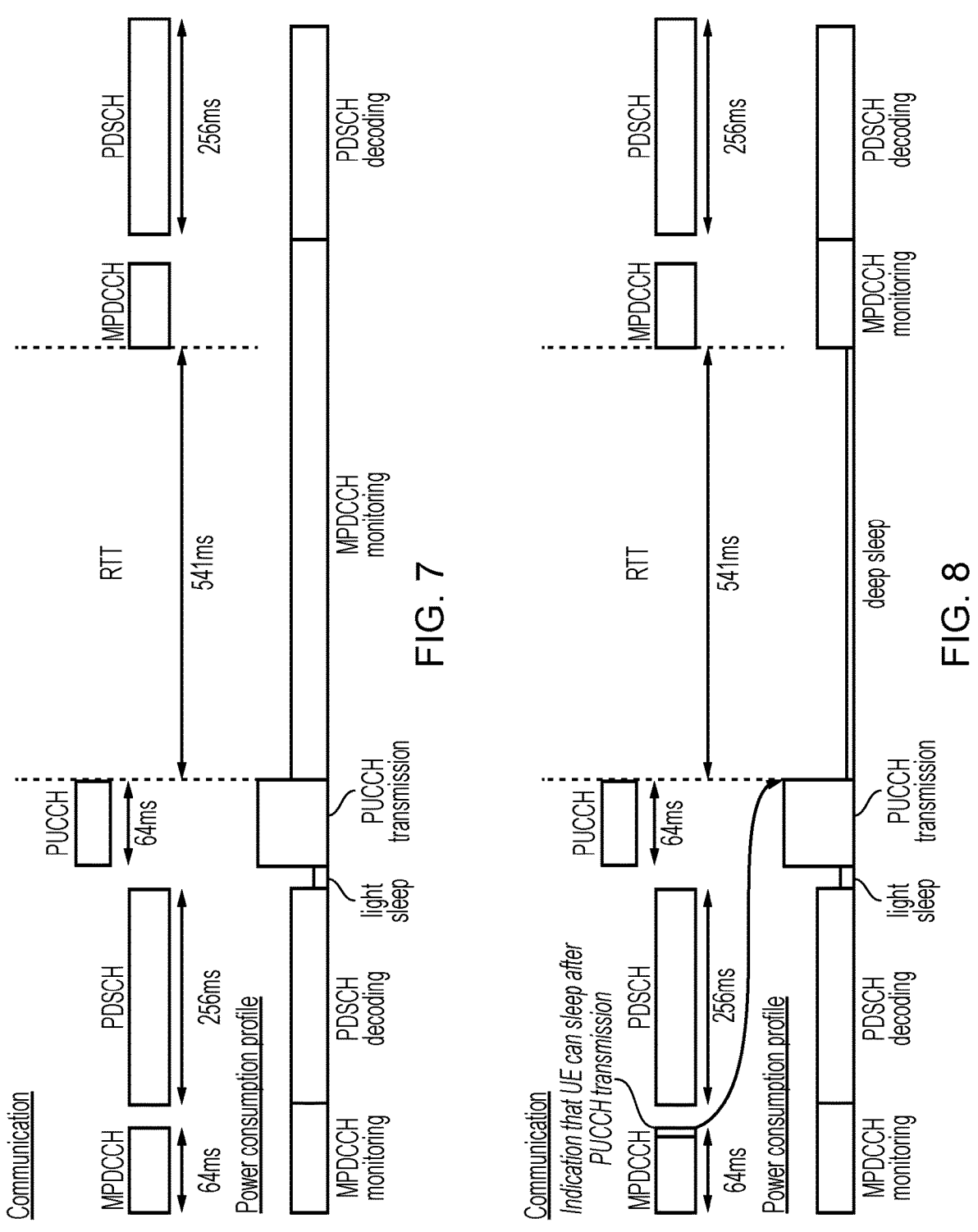
FIG. 7 illustrates the communications and power consumption profile in an NTN example use case.
FIG. 8 illustrates the communications and power consumption profile in accordance with an example technique.

FIG. 7 illustrates the communications and power consumption profile in an NTN example use case with a UE operating in a system with a large RTT. As illustrated in FIG. 7, by default, the UE still has to monitor the downlink control channel (e.g. MTC physical downlink control channel "MPDCCH") during the RTT period since it is possible that the UE can be scheduled in the downlink during the RTT period.

In accordance with the present disclosure, there are provided teachings and techniques to reduce power consumption at the terminal when there is a large RTT, which is particularly useful for IoT NTN communications. Accordingly, at least some of the power consumption for the UE's activities during an RTT period after an uplink transmission can be reduced, thereby enabling the terminal to save power.

In particular, it is recognised that in many cases after a downlink transmission and a related uplink transmission (e.g. acknowledgement or ACK/NACK transmission), the terminal will not be receiving further downlink data from the base station until after a time period of at least the RTT. Accordingly, it is proposed that the terminal enters a reduced power mode for a duration determined based on the RTT for the terminal. For example, after an uplink data transmission, the UE may sleep for a period of time before it is expected to receive data.

FIG. 8 illustrates the communications and power consumption profile in accordance with an example technique, where using this example technique the terminal can be instructed to sleep by the base station.

For example, when data is transmitted by the base station in the downlink, explicit signalling may be included which indicates that the UE can sleep or enter a reduced power mode. The base station for example determines whether to include this instruction or signalling based on whether downlink data is to be transmitted to the terminal or not—or based on how much downlink data is to be transmitted to the terminal. Further factors may be taken into account, for example regarding the quality of service, latency, type of data to be transmitted. In the present disclosure, reference to a "sleep" mode or period will be understood as references to a "reduced power" mode or period where the terminal can reduce its operations in order to save power.

The sleep period can start at the end of the uplink transmission (e.g. PUCCH) that is associated with the downlink transmission or at a time based on a time associated with the uplink transmission. In the example of FIG. 8, the sleep period starts at the end of the uplink transmission and lasts for a duration equal to or based on the RTT for the terminal.

The downlink signalling instructing the terminal to use a sleep mode may be carried in downlink control information "DCI" from the base station, for example by the DCI that schedules the downlink data. The signalling can indicate that the UE can sleep (e.g. because there is no imminent downlink data transmission).

Additionally or alternatively, a control element (e.g. MAC Control Element "MAC CE") for the downlink transmission (e.g. a MAC CE within the PDSCH) can indicate that the UE can use a sleep mode (e.g. because there is no imminent downlink data transmission).

Accordingly, the terminal may use a reduced power mode when notified or instructed by the base station that it can use this mode.

Alternatively or additionally, in some examples the UE may indicate that it is going to enter a sleep mode.

The UE can for example indicate in an uplink transmission that it will enter a sleep mode. The UE can for example send such a notification when it determines that it is unlikely to be scheduled downlink data or that it does not expect to receive downlink data in a time period which is calculated or estimated based on its RTT.

In some implementations, the UE can signal that it will go to sleep in a PUCCH transmission associated with the downlink transmission, for acknowledgement using PUCCH resources allocated for the terminal to send acknowledgement information for the downlink transmission. The terminal may in some cases sleep immediately after that PUCCH transmission.

In such a case and if the base station realizes that it has scheduled a downlink transmission to the UE between the time at which the UE transmitted the PUCCH and the time at which the eNodeB received the PUCCH (which is of the order of half of the RTT), the eNodeB can re-schedule such downlink transmissions (e.g. to a later time when the terminal is no longer in sleep mode). In this case, the base station may also reset any of the control loops that it might have otherwise altered in the absence of response from the UE.

This is because the base station is aware of the terminal being in sleep mode and may use this knowledge in the control loops rather than assume that the lack of response is due to the terminal attempting to receive the transmission and failing to do so. The base station would otherwise typically operate an outer loop functionality to control the downlink transmissions to the terminal, e.g. repetition level applied to the MPDCCH. In current systems, if the eNodeB treats the absence of response from the UE as an indication that the UE has not received the MPDCCH, the eNodeB would typically increase the repetition level applied to the MPDCCH. However, if the absence of response is due to the UE being in sleep mode rather than due to an unsuccessful decoding of the MPDCCH, changing the repetition level would not be motivated or justified by the radio conditions.

Figure 9:
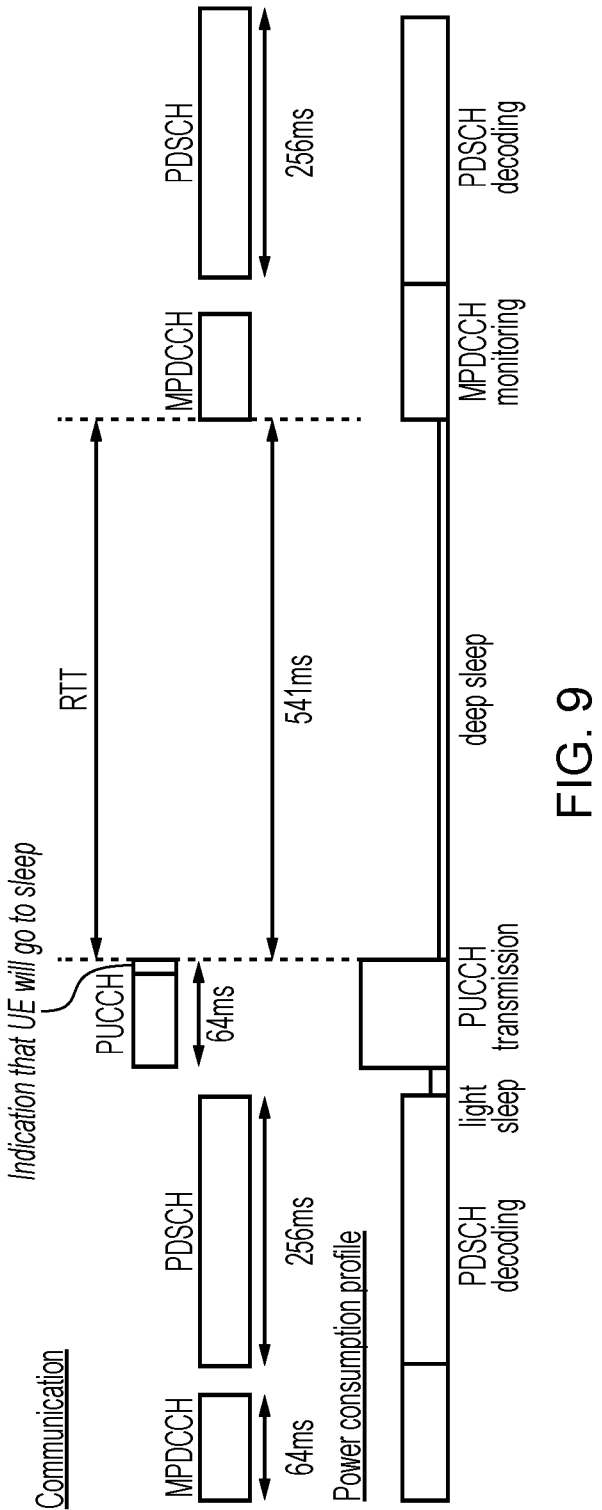
FIG. 9 illustrates the communications and power consumption profile in accordance with another example technique.

FIG. 9 illustrates the communications and power consumption profile in accordance with such a technique. In this example:

After an initial downlink control transmission (e.g. MPDCCH carrying a DCI) and associated downlink (data) transmission (e.g. PDSCH), the UE transmits uplink control information (e.g. acknowledgement information in a PUCCH transmission). In the present technique, the PUCCH transmission is expected to contain an indication that the UE will go to sleep (and optionally acknowledgement or HARQ ACK/NACK information).

After transmitting the indication in the PUCCH, the UE goes to sleep for the duration of the RTT.

If the base station had scheduled a downlink transmission to the UE during the sleep period (time marked as "RTT" in FIG. 9), the base station can re-schedule the transmission to a later time, e.g. after the sleep time period.

After the sleep period, the UE can monitor the downlink control channel (e.g. MPDCCH) again. As illustrated in FIG. 9, if it is scheduled a downlink transmission (e.g. PDSCH), it can proceed in a conventional manner.

While the examples above discuss the terminal going into sleep mode for a duration equal or substantially equal to the RTT, in some cases the sleep mode duration can be for a different duration. It will appreciated that despite the fact that a longer duration is technically feasible, this example implementation is not expected to be as valuable as other implementations. This is because the terminal is more likely to receive downlink transmissions again once the base station has had time to receive the uplink transmission and possibly reply on the downlink. On the other hand, an implementation where the terminal enters a reduced power mode for a duration which is less than the RTT can provide some benefits as will be clear below.

Figure 10:
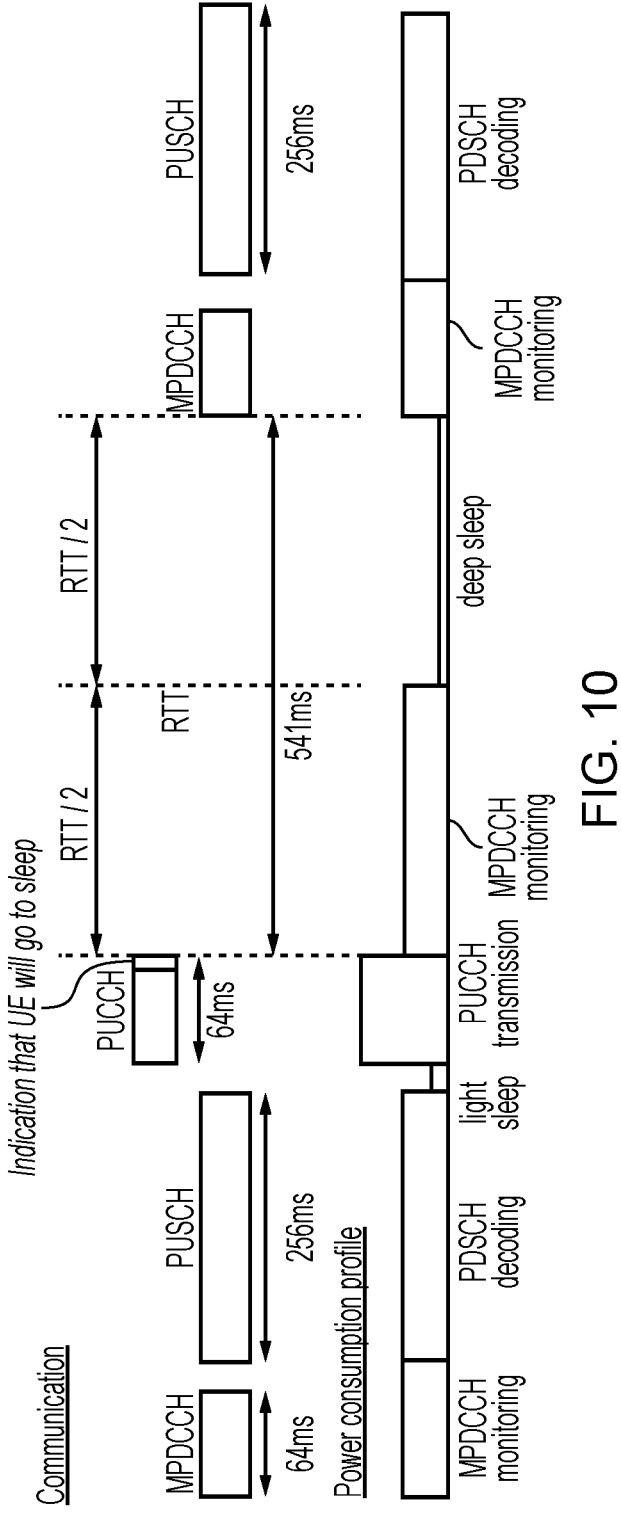
FIG. 10 illustrates the communications and power consumption profile in accordance with a further example technique.

FIG. 10 illustrates the communications and power consumption profile in accordance with a further example technique where the UE enters a sleep mode for a duration which is less than the RTT, namely which is half of the RTT in this example. This example may be particularly useful for cases where the terminal decides whether to enter a sleep mode without being prompted by the base station. This is because the base station might have already scheduled downlink transmissions for the terminal before the terminal decided to go into sleep. For example, if T=0 is the time at which the notification or indication is sent by the terminal, during times T=0 and T=RTT/2, the terminal will receive downlink transmissions sent by the base station between times T=−RTT/2 and T=0. By delaying the sleep period by RTT/2, the terminal may receive such notifications. Even if the terminal might miss some further downlink communications, the base station will receive an indicator from the terminal and can identify if any missed communication was received by the terminal while it was in sleep mode.

In this example, the UE signals in the PUCCH that it will go to sleep (see FIG. 9 and its discussion) and sleeps once that indication would have been received by the eNodeB. Compared to the example of FIG. 9, the UE will sleep for a shorter period and the start of the period will be delayed. If the eNodeB had scheduled a transmission for the UE before the UE had sent the indication in the PUCCH, the scheduling message would take a time RTT/2 to arrive at the UE and should thus arrive within RTT/2 of the UE transmitting its notification in the PUCCH. Thus, with this technique, the base station does not need to take remedial action since the UE can monitor the downlink control channel (e.g. MPDCCH) to capture any such intermediate scheduling for the UE.

In other words, in this example the UE monitors the control channel in a time period where it might receive a downlink transmission sent from the base station before a time when the UE sent a notification or indication.

Once this point in time is reached and the UE determines or expects that any downlink transmission sent before it decided to go into sleep mode would have arrived at the terminal, and assuming the UE had not been scheduled downlink data, the UE can sleep until the end of the RTT. This is illustrated in FIG. 10 which shows the following:

After an initial downlink control transmission and (data) transmission (e.g. MPDCCH/PDSCH), the UE transmits a PUCCH. In this example, the PUCCH contains a notification or indication that the UE will go to sleep (and for example contains HARQ ACK/NACK information as well).

After transmitting the indication in PUCCH, the UE continues monitoring MPDCCH for a limited period.

After a time RTT/2 after the transmissions of the indication, the UE has not been scheduled in the downlink and the UE understands that any downlink transmissions sent by the eNodeB before the terminal transmitted the notification would have arrived. Hence, the UE knows that the eNodeB will now be aware that the UE will not receive transmissions arriving between T=RTT/2 and RTT (i.e. sent by the eNodeB between T=0 and T=RTT/2) and the UE will go to sleep for the remainder of the RTT.

The UE can then sleep for the remainder of the RTT period after the indication.

Following the end of the RTT, the UE can wake up and monitor MPDCCH.

In a case where the base station had sent a further downlink transmission to the terminal before the time the UE sent the notification where the further downlink transmissions is received between T=0 and T=RTT/2, the terminal can complete the reception of the further downlink transmission. For example, even if the further downlink data transmission (e.g. PDSCH) corresponding to the further downlink transmission (e.g. PDCCH or MPDCCH) arrives in the second half of the RTT period, the terminal can remain in operation rather than a sleep mode to receive the transmission. In some cases, the terminal may enter a sleep mode once it has received the further downlink transmission; in some cases, once it has sent an associated uplink transmission (e.g. comprising acknowledgement information) it can go to sleep (e.g. for less than RTT/2) while in other cases, the receipt of such intermediate downlink transmission may cancel the sleep mode operation of the terminal for this time period.

When used, the notification from the UE may comprise in some cases one or more of the following:

A duration for which the UE will go into sleep mode;

A length of time in millseconds for which it will sleep;

A number of subframes for which it will sleep;

an "on/off" indication indicating whether it will sleep a sleep pattern to be used by the terminal. The sleep pattern or reduced power mode pattern may for example indicate one or more of: whether the terminal will sleep for the entire RTT duration, for half of the RTT duration, for the first half of the RTT duration, one of a set of predetermined sleep patterns, etc.

Likewise, when used, the notification from the base station may comprise in some cases one or more of the following:

A duration for which the UE may go into sleep mode;

A length of time in millseconds for which it may sleep;

A number of subframes for which it may sleep;

an "on/off" indication indicating whether it may sleep a sleep pattern to be used by the terminal. The sleep pattern or reduced power mode pattern may for example indicate one or more of: whether the terminal may sleep for the entire RTT duration, for half of the RTT duration, for the first half of the RTT duration, one of a set of predetermined sleep patterns, etc.

It is expected that the following sleep pattern and indication combination might be particularly helpful:

When the base station transmits an indication that the terminal may enter a sleep mode, the UE may sleep for a time "RTT" (with or without transmitting an indication in PUCCH). In some cases, the UE will always use this pattern when receiving a downlink indication (as no downlink transmission is expected from the base station) and may use the same or a different pattern when no downlink indication has been received.

When the terminal transmits an uplink indication (e.g. and when the base station did not send a downlink indication associated with the downlink and uplink transmissions/(M)PDSCH and PUCCH) the terminal may monitor the downlink control channels (e.g. MPDCCH) for a first half RTT period after the uplink transmission and then sleep for a time of RTT/2 for the second half. This is because, as discussed above, the terminal does not know whether the base station had already scheduled data before it could receive the uplink indication. Accordingly, this combination of notification(s) and sleeping pattern is expected to provide power savings while reducing the risk of missing downlink communications.

In some cases, the "full RTT" sleep pattern may be used by default when notified from the base station while the terminal, if configured to go to sleep without having received a downlink notification, will make a separate pattern selection, e.g. to use a different pattern in some cases. For example, it may use a pattern indicated by the base station, or a pattern selected by the terminal (which may be indicated by the terminal) or may use a different default selection (e.g. always "sleep for second RTT/2" pattern when going into sleep without having received a downlink notification).

It should also be noted that the notification from the base station may comprise one or both of two parts, for example a first notification that indicates whether the terminal can go to sleep (e.g. sent in the DCI in the MPDCCH) and a second notification that indicates a sleep pattern for the terminal to use when going into sleep mode. These two notifications may also be associated with different times. For example, the second notification might be sent with the first notification (e.g. in the DCI/MPDCCH) or it might be sent separately using different signalling (RRC signalling in some cases). In another example, the first notification indicates a list of configurations or of configuration parameters (e.g. any combination of an absolute or relative start time, an absolute or relative end time, a sleep duration, a sleep pattern, etc.) where the second notification indicates which configuration or configuration parameter(s) to use. The configuration selection indicated by the second notification can be treated as an implicit notification that the terminal can enter into sleep mode (using the indicated selected sleep configuration).

In the present disclosure, references are made to a sleep pattern in the interest of conciseness, however it will be appreciated that sleep pattern can be used interchangeably with a sleep configuration or a set of one or more sleep configuration parameters, as discussed above.

If the base station notifies the terminal of a sleep pattern, the terminal may in some cases implement the behaviour by default without sending an uplink notification. In this case, by default the base station can assume that the terminal is in sleep mode whether it actually is or not. In other cases, the terminal will be expected to indicate (e.g. using an uplink notification) whether it will actually go into sleep mode or not. This use case is particularly useful if the sleeping pattern is longer than the RTT.

In one example, the base station signals via RRC signalling a sleep pattern that the UE can apply (e.g. following the transmission of an uplink or PUCCH indication and/or reception of a downlink or DCI indication). In cases where the UE signals in the uplink an "on/off indication" indicating whether it will enter sleep mode or not, both the UE and base station can then know which sleep pattern will be applied by the terminal.

In one example, the DCI can indicate a sleep pattern and/or a time period for which the UE may sleep following the MPDCCH and, optionally, the UE may indicate on the uplink (e.g. in an uplink control transmission) whether it went to sleep for the time period indicated in DCI.

In some cases, a sleep time period (sent in the DCI or elsewhere) can be sent as an index with reference to a table (where the table may for example be configured via RRC signalling) to indicate which sleep pattern the UE can apply.

In some cases, the sleep pattern can be associated or defined relative to a DRX pattern with a DRX ON period and a periodicity. For example, with NTN systems, the RTT is expected to be longer than the DRX ON periodicity (the length of the DRX cycle), let alone the DRX period (the time period or duration during which the UE is in DRX ON). Accordingly, the sleep pattern can be configured to correspond to any DRX ON period which is within the relevant RTT or RTT-based period. As an illustrative example, we can consider a case with a RTT of 512 ms; a DRX ON period of 64 ms (depending on the link budget, 64 ms may be a sufficient duration of MPDCCH to provide reliable performance in a GEO satellite constellation) and a DRX period of 128 ms. In this example, during the RTT, the UE would have to wake up four times in order to read the MPDCCH in accordance with the DRX period and periodicity. The sleep pattern may be configured to correspond to the DRX ON configuration and in particular to correspond to the DRX ON time period(s) within the sleep period in accordance with the present disclosure. The UE may be configured with more than one DRX configuration, where a first DRX configuration is applied by the UE during the RTT time and a second DRX configuration is used outside the RTT time.

It will be appreciated that other sleep patterns are considered under the present disclosure, as long as they are technically feasible, such as a bitmap or bitmap like pattern indicating for which subframe or radio frames the UE needs to wake up and/or can be in sleep mode.

While in the discussion above it is assumed that the base station will receive the uplink notification, it will be appreciated that in some cases, the uplink notification may not be received (e.g. not decoded successfully) by the base station. For example, a noise event may mean that a PUCCH is not actually received by the eNodeB. When this type of error event occurs, an eNodeB implementation is expected to be capable of handling the situation as it usually would. For example, if the eNodeB does not receive a PUCCH that it was expecting, it would know that the PUCCH had not been received and would be able to take mitigating action, such as adjusting a transmission configuration (e.g. modulation, coding, power, etc.).

In some implementations, while the UE may be notified that it can go to sleep, the UE may determine not to go to sleep. Said differently, while a downlink notification that the terminal can go into sleep mode can be seen as an instruction to sleep (from one perspective), the terminal may decide not to follow the instruction.

Whether it might be appropriate for the UE to sleep as discussed above is based on whether the UE will, might or is expected to be scheduled downlink data however it will be appreciated that the terminal may also take into account its own status and transmissions before determining whether to enter a sleep mode. For example, the UE may decide not to sleep if it has identified that it has uplink data to send to the base station.

In some examples, if the UE buffer status for uplink transmissions is greater than zero, the UE can monitor the DCI for uplink grant even if it would have otherwise been able to sleep. While the UE may have been allowed to sleep according to other examples in this invention, if the UE wishes to be scheduled to transmit uplink data, the UE can continue to monitor MPDCCH for a DCI scheduling an uplink grant. In an example, the UE signals in the PUCCH that it will monitor MPDCCH.

In one example, the UE can signal in PUCCH that it will monitor for DCI sending uplink grant.

In one example, if the UE has sent a buffer status report, BSR, to the eNodeB indicating uplink data in the UE's buffers, the UE monitors for uplink grant even if it would otherwise have been able to sleep. This is because the UE may be expecting an uplink grant and the base station may understand that the UE will in this case monitor the MPDCCH for any DCI(s) containing an uplink grant.

Alternatively or additionally, if the UE had transmitted uplink data that is still unacknowledged, the UE can monitor for a DCI with an uplink grant, even if it would have otherwise been able to sleep. This is because the uplink transmission may not have been received successfully and the base station may schedule uplink resources for a retransmission.

In addition, in some cases, if the UE had recently sent a scheduling request, SR, the UE can monitor the downlink control channel for a DCI comprising an uplink grant even if it would have otherwise been able to sleep. This is because the UE may be allocated uplink resources in response to the scheduling request.

It should be noted that in some cases, once the terminal is expected to be asleep, the base station may wait for the end of the sleep period to send signals addressed specifically to the UE (e.g. a DCI). The base station can then send signals which are timed to arrive at the UE after the end of the sleep period. This can enable the base station to delay the transmissions of any otherwise expected uplink grant.

As long as the UE and base station are configured with the same behaviour (either in a pre-configured—e.g. standardised—and/or using signalling regarding the configuration), either of the options can be implemented.

As mentioned above, in some cases after sending the uplink control transmission, e.g. PUCCH, (with or without a notification that it will sleep) the UE can sleep for the duration of the RU period after transmission of uplink data. In this example, the UE does not monitor downlink transmissions after sending an uplink transmission until it can potentially receive downlink data related to that uplink transmission. The first time that the UE can receive downlink data related to the uplink transmission is after the RU period after the uplink transmissions. While the UE is in a reduced power node, it can stop monitoring downlink data, thereby reducing power consumption of the UE's receiver. It may also enter one of several reduced power states, such as a light sleep or deep sleep state.

It should be noted that while the UE is in sleep mode, it may still be using other functions and/or may be performing other functions, such as determining its GNSS location. As the UE has reduced the power consumption of at least the receiver, the UE would still be operating in a reduced power mode or state.

In one example, the UE can determine whether to enter a sleep mode or not depending on whether it had sent any uplink control transmission in a time period before the RU duration (e.g. immediately before the RU duration), for all acknowledgement processes (e.g. HARQ processes) currently running at the terminal.

In some cases, a UE can have two or more HARQ processes running. When the UE operates with two HARQ processes, if one of the HARQ processes has received its downlink data (PDSCH1) and a response PUCCH (PUCCH1) is in transit to the eNB, if the other HARQ process does not have PUCCH in transit, the UE can to stay awake and monitor the (M)PDCCH, even after the PUCCH1 transmission has been sent. The UE can thus monitor the (M)PDCCH in case the second HARQ process is scheduled a downlink transmission, after the PUCCH1 transmission.

On the other hand, if both HARQ processes have PUCCHs in transit (e.g. PUCCH1 and PUCCH2), it is not expected that the UE will be scheduled transmissions in the downlink for these HARQ processes in the period between the later of PUCCH1 and PUCCH2 and an elapsed time of the RU period starting following the earlier of PUCCH1 and PUCCH2. This is because the HARQ processes are filled with previous data and the UE may thus sleep for the RTT period.

Said differently, if the terminal has two or more acknowledgement processes running where acknowledgement messages have been sent for each of the acknowledgement processes, the terminal can enter a power saving mode. The power saving mode may be activated:

from a time which corresponds the later of the last acknowledgement message for each of the processes and until a time which is corresponds to an RTT time period after the earlier of the last acknowledgement message for each of the processes.

Figure 11:
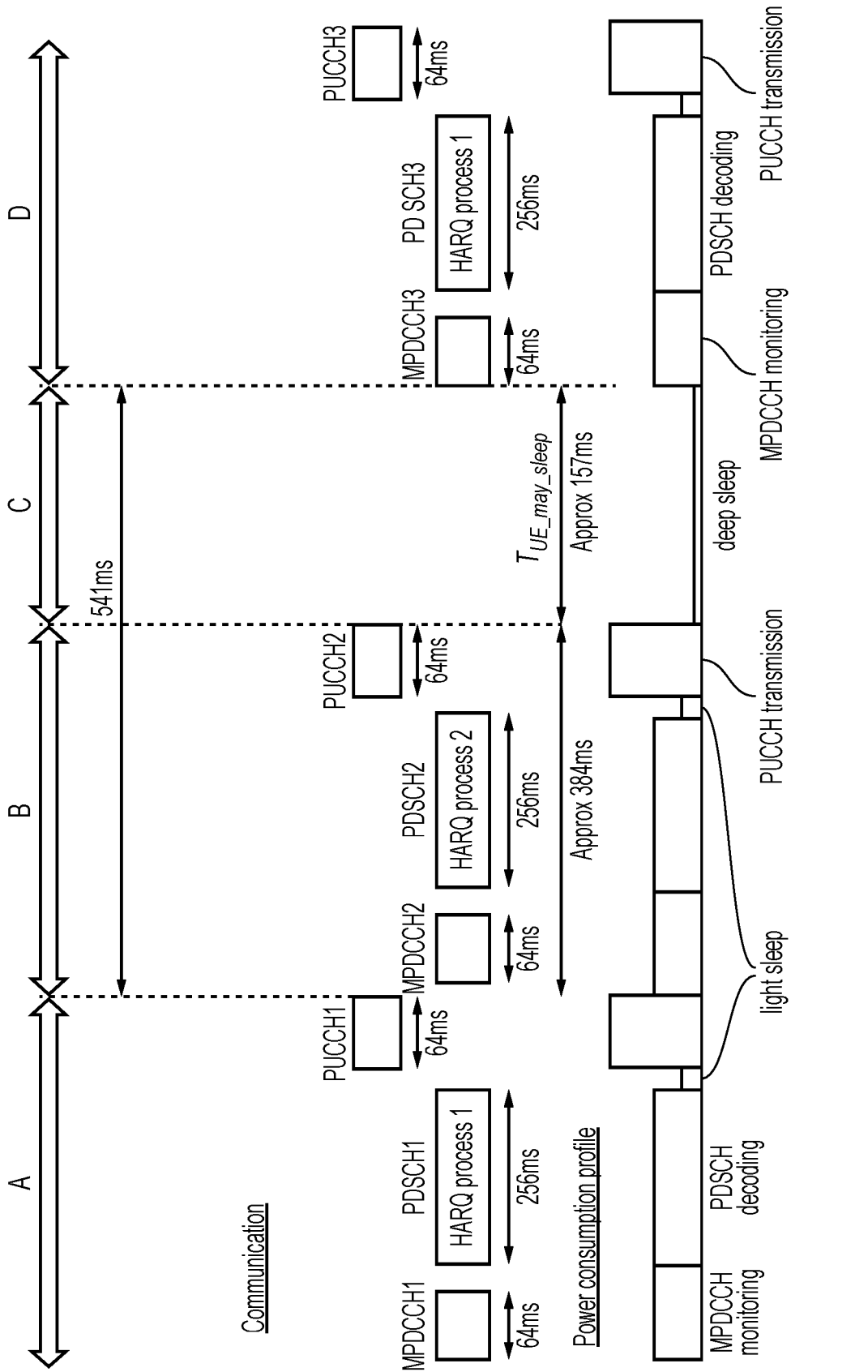
FIG. 11 illustrates the communications and power consumption profile in accordance with an additional example technique.

FIG. 11 illustrates the communications and power consumption profile in accordance with this example arrangement. FIG. 11 illustrates an example operation in four phases, A to D (from the terminal's perspective) as well as a power consumption profile of the UE. The phases go as follows:

Prior to A. The UE does not have data in its HARQ buffers.

Phase A. The UE receives MPDCCH1 and an associated PDSCH (PDSCH1). MPDCCH1 indicates that the soft bits related to PDSCH1 are to be stored in HARQ process 1. The UE determines the decoding status of the PDSCH: whether PDSCH1 is to be ACK-ed or NACK-ed. This decoding status is signalled to the gNB in the PUCCH (PUCCH1 transmission). At the end of the transmission of PUCCH1, the UE starts a timer, $T_{RTT}$, that is set to the round trip time (RTT) between the UE and the eNB.

Phase B. The UE receives MPDCCH2 that allocates PDSCH2 that is to be decoded in HARQ process 2. The UE determines an ACK/NACK status for the decoded PDSCH2 and sends this ACK/NACK status in PUCCH2 associated with PDSCH2. At the end of the PUCCH2, the UE can go to sleep as (1) all HARQ processes have uplink acknowledgement transmissions that have been sent and (2) these have all been sent within a time of RTT or less before (as measured by the timer which has not expired when PUCCH2 is sent).

The length of time that the UE can sleep is equal to the time remaining on the $T_{RTT}$ timer so that the sleeping time period ends at a point in time which is an RTT time after the earlier of the acknowledgement messages for the terminal. This sleeping time is identified as $T_{UE\_may\_sleep}$ in FIG. 11.

Phase C. As discussed above and according to this example implementation, the UE understands or estimates that it will not be scheduled data during phase C (the time between the PUCCH2 being sent and the expiry of the RTT timer from PUCCH1 being sent). Accordingly, the UE sleeps during phase C and saves energy.

Phase D. The can UE wake up and monitor the MPDCCH again. In the example of FIG. 11, the UE receives MPDCCH3 and PDSCH3 that is related to MPDCCH1/PDSCH1 that were transmitted in phase A. It should be pointed out that "related" can mean that it for example uses the same HARQ process for an initial transmission or that it is used for a HARQ re-transmission. However the same teachings and techniques apply equally of MPDCCH3/PDSCH3 is not related to MPDCCH1/PDSCH1 or MPDCCH2/PDSCH2.

Accordingly, whenever the terminal sends an uplink transmission for an acknowledgement process while at least one other acknowledgement process is running, the terminal can start a timer set to the value of the RTT and if all acknowledgement processes have sent an uplink transmission before the timer expires, then the terminal can go to sleep until the timer expires. Said differently, for each uplink transmission for an acknowledgement process while at least one other acknowledgement process is running, the terminal can start a timer set to the value of the RTT and the terminal can go to sleep if all timers are still running and remain asleep until a first of the timers expires.

Such a mode of operation may for example be preconfigured in the terminal or may be configured via signalling from the base station to the terminal, e.g. RRC signalling.

It will be appreciated that different values or approximations of the RTT may be available and/or used by the UE and base station.

In some cases, the RTT (e.g. shown spanning phases B and C with the value of "541 ms" in FIG. 11) is the minimum RTT within the satellite beam between the UE and base station. In some cases, there may be different estimations of the RTT and/or the RTT may vary over time. In such cases, the terminal can use a minimum RTT value so as to avoid overestimating the duration of the sleep period. The minimum may be a minimum of different RTT estimations and/or a minimum over an estimation time period.

In some cases, the RTT can be a value calculated based on the UE's GNSS determination and position and velocity (PV) information that is signalled by the eNB to the UE. The RTT value may be additionally based on the distance between the eNB and the satellite/aerial platform component of the non-terrestrial equipment, where this aspect of the RTT may be signalled to the UE. Alternatively, a minimum value may be assumed for the RTT component between the satellite/aerial platform and this minimum value can be used as part of the calculation of the RTT by the UE. The minimum value may correspond to the distance between the satellite/aerial platform and an eNB located directly under the satellite/aerial platform. The RTT calculation may also take into account whether the eNB is located on the ground or in the satellite/aerial platform.

In some cases, the RTT may be adjusted for running the timer, $T_{RTT}$. For example, it may take into account processing and scheduling delays at the eNodeB. For example, while the (example) FIG. 5 41 ms that is shown in the Figure is based on the flight time of packets, an actual RTT may also include the time required for the eNodeB to decode the PUCCH and to schedule and/or encode an MPDCCH (if responding with an MPDCCH). The additional time that the UE should assume for decoding and scheduling at the eNodeB, $T_{eNR\_RTT}$, can either be predefined (and known by the UE and base station), signalled to the UE or based on a combination of both. Currently, in some standards for terrestrial eMTC, a typical suggested value for $T_{eNB\_RTT}$, is set to be 4 ms.

In some cases, one or more characteristics of the sleep time period may be calculated by the base station and transmitted by the base station to the terminal. In one example, the time or duration that the UE may sleep while awaiting a response from the base station (e.g. $T_{UE\_may\_sleep}$ in FIG. 11) can be signalled by the base station to the UE.

For example, a configuration for the time value for $T_{UE\_may\_sleep}$ may be configured by RRC signalling where the RRC signalling can be either unicast or can be signalled in system information (e.g. in a SIB transmission). In this or other examples, the base station may for example broadcast (e.g. in the SIB) a default RTT value to be used by UEs when determining whether to enter a sleep mode or not, and which may then be applicable on a cell-wide basis.

Alternatively or additionally, time value $T_{UE\_may\_sleep}$ may be signalled by DCI that is carried in MPDCCH1 or MPDCCH2 (in phase A or B) in FIG. 11. When signalled via DCI, the gNB may also account for changing values of RTT as the satellite moves and may also account for scheduling decisions that the gNB may take (for example, if the cell is congested, the DCI could signal a larger value of $T_{UE\_may\_sleep}$ (e.g. to be larger than a value based solely on RTT considerations) to allow the UE to sleep for a longer period of time while other UEs are scheduled.

In some cases, the time from which the UE starts counting for the RTT (e.g. starts the timer) is related but not identical to the end of the PUCCH transmission of the first HARQ process, i.e. it does not start exactly at the end of that PUCCH transmission. This implementation takes into consideration the fact that the eNodeB may be able to decode the PUCCH before the end of the PUCCH transmission. For example, if the PUCCH is transmitted with many repetitions in an NTN system (e.g. to help overcome the pathloss and consequent reduction in SNR), in some cases the base station may be able to successfully decode the PUCCH early (i.e. without using the full number of repetitions).

It should be noted that this example can be considered as equivalent to the timer being based on the RTT where an early decoding time may be deducted. The early decoding time may correspond to the estimated or expected time that may be saved by the base station if decoding a transmission early (and thus possibly responding early as well). In this case, the timer starts at the end of the PUCCH albeit for a reduced time relative to the RTT (the RTT being the RTT with or without the additional base station processing time as discussed above).

Figure 12:
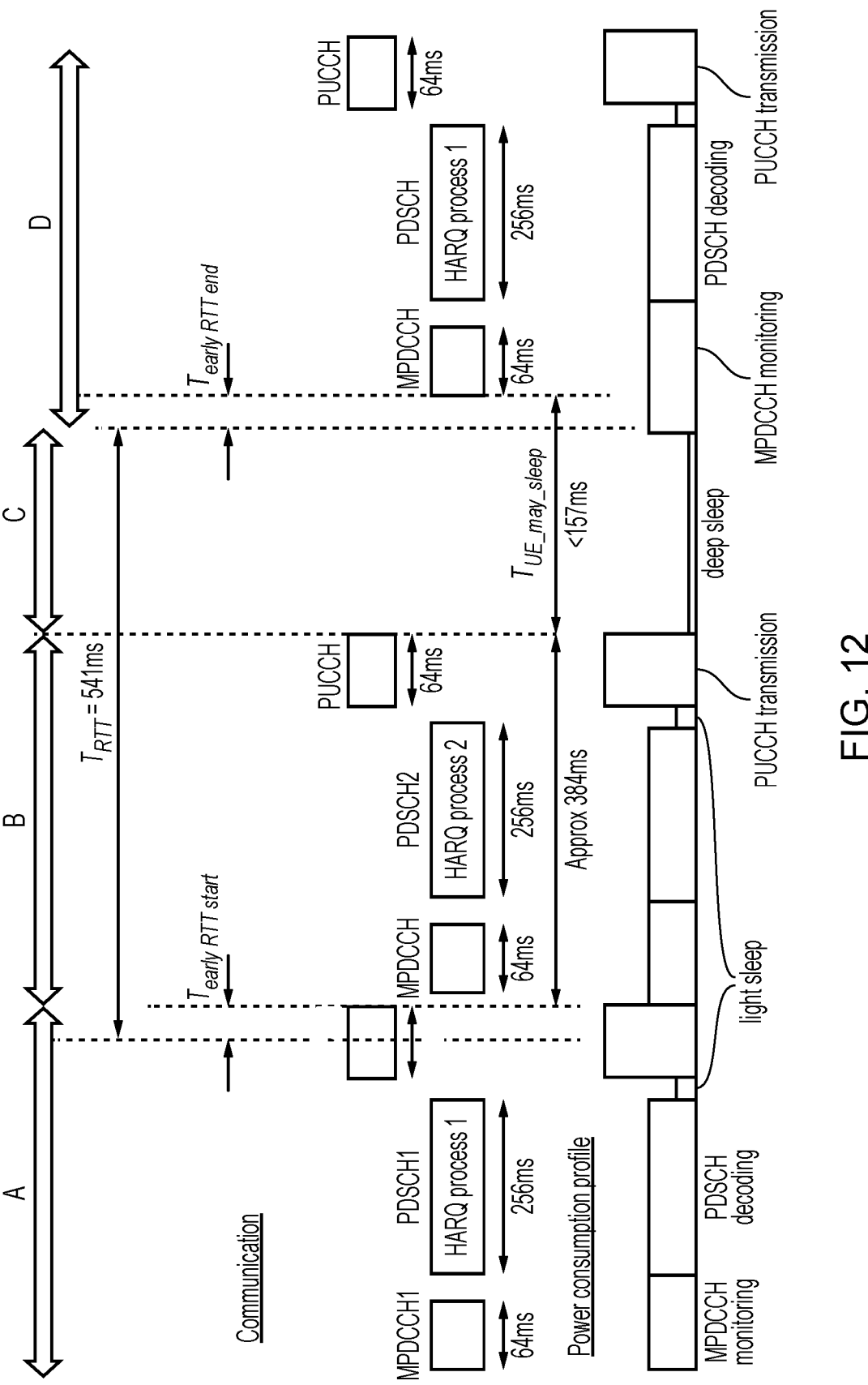
FIG. 12 illustrates the communications and power consumption profile in accordance with a further example technique.

This example implementation is illustrated in FIG. 12 which shows the following:

Phase A: The round trip timer, $T_{RTT}$, is started at a time $T_{early\_RTT\_start}$ before the end of the first PUCCH. As mentioned above, this is equivalent to starting the timer at the end of the first PUCCH and reducing the RTT timer by $T_{early\_RTT\_start}$.

Phase B: see the discussion in respect of FIG. 11.

Phase C: see the discussion in respect of FIG. 11, the main difference with the example of FIG. 11 is that the sleep period will expire earlier than the sleep period in the example of FIG. 11.

Phase D: The UE can start monitoring for MPDCCH a time $T_{early\_RTT\_end}$ before the end of the RTT, where the RTT is measured relative to the end of the first PUCCH. Since the UE has to monitor MPDCCH early (compared to the example of FIG. 11), the UE is able to sleep for a shorter time duration. i.e. the UE will monitor MPDCCH during a time $T_{early\_RTT\_end}$ at the end of phase C/at the beginning of phase D which was not previously monitored.

In the above description, the time at which the UE starts monitoring for MPDCCH before the end of the RTT, $T_{early\_RTT\_end}$, may be different to the amount of time, $T_{early\_RTT\_start}$, for which the timer is started early. For example, applying a $T_{early\_RTT\_end}$ value that is smaller than $T_{early\_RTT\_start}$ would allow the system to account for scheduling delays at the eNB, e.g. the time needed to schedule an MPDCCH following PUCCH reception. In other cases, $T_{early\_RTT\_end}$ is equal to $T_{early\_RTT\_start}$. In some cases, the two values may be identical and scheduling delays or other period adjustment(s) may be taken into account as part of the RTT calculation or estimation.

While the power savings will be somewhat smaller in the example, the reduction can be made relatively small (compared to the overall savings) and can be balanced by a reduced likelihood of missing a downlink transmission from the base station (in cases where the base station can decode early, before the full uplink transmission is received at the base station).

Accordingly, using teachings and techniques of the present invention, the power consumption associated with terminals communicating in an NTN system can be better controlled.

Figure 13:
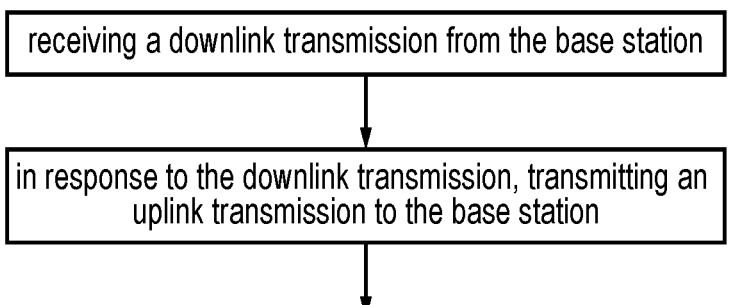
FIG. 13 illustrates an example method of operating a terminal in a mobile telecommunications system comprising an NTN.

FIG. 13 illustrates an example method of operating a terminal in a mobile telecommunications system comprising an NTN. The method comprises receiving a downlink transmission from the base station and, in response to the downlink transmission, transmitting an uplink transmission to the base station (for example an acknowledgement message related or in response to the downlink transmission).

Based on the uplink transmission and on a round trip time for the terminal, the terminal determines whether it will enter a reduced power mode during a time period. In the reduced power mode, the terminal is configured to reduce a power consumption of at least a receiver of the terminal for communicating via the air interface. For example, the terminal may still be active using other functions (e.g. transmitter, GNSS receiver and/or system, etc.) but will reduce the power consumption of the receiver, e.g. by not monitoring a downlink control channel (e.g. MPDCCH or PDCCH). Accordingly, the terminal will be able to reduce its power consumption, at least in respect of its receiver (and optionally of its transmitter as well).

For example, if and when it is determined that the terminal will enter a reduced power mode, the terminal can then reduce the power consumption of the receiver during the time period.

In some cases, determining is based on a downlink notification received from the base station and associated with the downlink transmission. For example, the downlink notification can indicate that the terminal may enter a sleep or reduced power mode and based on the notification (and optionally other factors) the terminal can decide to reduce its power consumption for at least its receiver. In one example, the downlink notification comprises one or more of: a notice that the terminal can enter a reduced power mode; a start time for the time period; and end time for the time period and a duration for the time period. Alternatively or additionally, the downlink notification may be transmitted in one or more of: downlink control information associated with the downlink transmission; downlink control information scheduling the downlink transmission; a control element of the downlink transmission; and a MAC control element of the downlink transmission.

In some implementations, the method comprises receiving, from the base station, information identifying a first sleep period configuration; and identifying the time period based on the first sleep period configuration. If a downlink notification is received, this information may be sent as part of, alongside or separately to the downlink notification.

In some examples, the terminal receives from the base station a set of two or more sleep period configurations and receives information identifying a first sleep period configuration of the set of two or more sleep period configurations. The set and the information may be transmitted together or separately, as discussed above. The terminal may then identify the time period based on the first sleep period configuration (and optionally other elements or information). In some cases, the set of two or more sleep period configurations can be received via RRC signalling.

Whether the information identifying the first sleep period configuration is associated with a set of two or more sleep period configurations or more, it may be transmitted in RRC signalling or in downlink control information associated with the downlink transmission.

In some examples, upon determining the time period, the terminal can transmit an uplink notification to the base station indicating that the terminal will enter a reduced power node. In one example, the uplink notification comprises one or more of: a start time for the time period; an end time for the time period and a duration for the time period. In one example, the uplink notification simply indicates that the terminal will enter a reduced power mode and the base station can assume that the terminal will follow a predetermined behaviour (e.g. a standardised behaviour). The method may further comprise determining the time period based on a selected sleep period configuration, wherein the uplink notification comprises information identifying the selected sleep period configuration.

As discussed above, the time for a signal to travel back and forth between the terminal and the base station can comprise a flight time for the signal to travel from the terminal to the base station and back from the base station to the terminal. In some cases, it may also take into account one or both of: (1) a processing delay, to be added to the RTT, corresponding to an estimated processing time for the base station to process an incoming transmission from the terminal before responding to the terminal; and (2) an early decoding time, to be deducted from the RTT, corresponding to a time saving for the base station to decode an incoming transmission from the terminal early, before the incoming transmission is fully received by the base station. By using an adjusted RTT, the system may use a more accurate estimation of the appropriate RTT value for the purpose of saving power. Accordingly, the teachings provided herein can be applied equally to an RTT based purely on signal or packet traveling time or based on an adjusted RTT as discussed in this paragraph and above.

In some cases, the time period has a duration corresponding to the round trip time or to half of the round trip time (where the RTT may include the adjustments discussed in the paragraph above).

The time period may start when the transmission of the uplink transmission ends or after an intermediate time period has expired, the intermediate time period starting when the transmission of the uplink transmission ends. The intermediate period can for example have a duration of half the round trip time.

In cases where the terminal operates with a plurality of acknowledgement processes, the terminal can start, for each acknowledgement process of the plurality of acknowledgement processes and after transmission of an uplink transmission associated with the each acknowledgement process, an associated timer set to the RTT. If and when, for every one of the plurality of acknowledgement processes, the associated timer has started and has not expired, the terminal can enter a reduced power mode. Said differently when all acknowledgement processes have an associated timer which is running and has not yet expired, then the terminal can start the time period and enter a sleep mode. As a separate aspect related to this example, when the terminal is in reduced power mode, the terminal can exit the reduced power mode when a first timer associated with a first of the plurality of acknowledgement processes expires.

Figure 14:
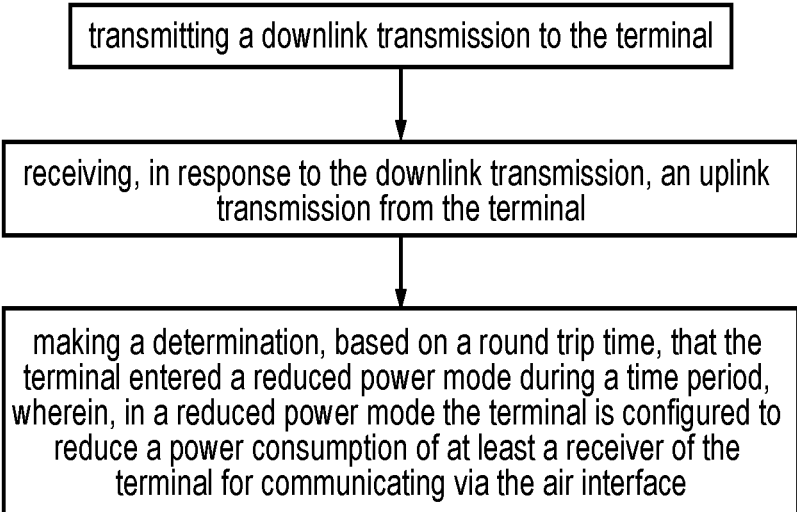
FIG. 14 illustrates an example method of operating a base station in a mobile telecommunications system comprising an NTN.

FIG. 14 illustrates an example method of operating a base station in a mobile telecommunications system comprising an NTN. In this method, the base station can transmit a downlink transmission to the terminal (e.g. a PDSCH, optionally a PDSCH and (M)PDCCH). The base station can receive, in response to the downlink transmission, an uplink transmission from the terminal and make a determination, based on a round trip time for the terminal and base station, that the terminal entered a reduced power mode during a time period wherein, in a reduced power mode the terminal is configured to reduce a power consumption of at least a receiver of the terminal for communicating via the air interface.

As for the terminal, the base station can make this determination based on a downlink notification sent to the terminal and/or based on an uplink transmission received from the terminal, or based on a pre-configured (e.g. standardised) behaviour of the terminal and/or of the base station.

The teachings and techniques discussed above in respect of the terminal apply equally in respect of the base station.

In one example the base station, upon making the determination, can identify whether a further downlink transmission transmitted to the terminal would have been received during the time period. If it is determined that the further downlink transmission was expected to be received during the time period, the base station can disregard the lack of response to the further downlink transmission in a communication configuration function of the base station. For example, the lack of response may be ignored when the base station is operating one or more of its control loops. Such communication configuration functions can affect for example a repetition level, a transmission power level, a modulation scheme, a coding scheme, etc. This is because the lack of response is not due to the terminal being unsuccessful at receiving the further transmission but is due to the terminal being in sleep mode at a time when it would have been received. Therefore no useful information can be derived from the lack of response from the terminal.

It will be appreciated that while the present disclosure has been provided in the context of current systems and terminology, it is not limited to these particular examples. For examples, any reference to a PDSCH may be understood as a reference to a downlink transmission. References to a PUCCH or PUSCH may be understood as an uplink transmission and a PUCCH can often be considered as a transmission of acknowledgment feedback for a downlink transmission.

Likewise, references to GNSS may be understood as references to a positioning system and GNSS information as location or position information. DCI may be understood as downlink control information, e.g. comprising a downlink and/or uplink grant and sometimes also including configuration information for the corresponding scheduled downlink and/or uplink transmission(s).

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example, transmitting a message may involve using several resource elements in an LTE or NR environment such that several signals at a lower layer correspond to a single message at a higher layer. Also, transmissions from one node to another may relate to the transmission of any one or more of user data, system information, control signalling and any other type of information to be transmitted. It will also be appreciated that some information may be notified or indicated implicitly rather than through the use of an explicit indicator.

Also, whenever an aspect is disclosed in respect of an apparatus or system, the teachings are also disclosed for the corresponding method and for the corresponding computer program. Likewise, whenever an aspect is disclosed in respect of a method, the teachings are also disclosed for any suitable corresponding apparatus or system as well as for the corresponding computer program. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example, any one or more of a mobile node or network node may be configured accordingly if appropriate, so long as it is technically feasible and not explicitly excluded.

Whenever the expressions "greater than" or "smaller than" or equivalent are used herein, it is intended that they disclose both alternatives "and equal to" and "and not equal to" unless one alternative is expressly excluded.

It will be appreciated that while the present disclosure has in some respects focused on implementations in an LTE network as such a network is expected to provide the primary use case at present, the same teachings and principles can also be applied to other wireless telecommunications systems. Thus, even though the terminology used herein is generally the same or similar to that of the LTE (or 5G) standards, the teachings are not limited to the present versions of LTE (or 5G) and could apply equally to any appropriate arrangement not based on 5G/LTE, for example any arrangement possibly compliant with any future version of an LTE, 5G or other standards—defined by the 3GPP standardisation groups or by other groups. Accordingly, the teaching provided herein using 3GPP, LTE and/or 5G/NR terminology can be equally applied to other systems with reference to the corresponding functions.

It will be appreciated that the principles described herein are applicable not only to certain types of communications device, but can be applied more generally in respect of any types of communications device. For example, while the techniques are expected to be particularly useful for NTN systems, the skilled person will appreciate that they can also be applied to other systems which for example face similar challenges and which are expected to benefit in a similar manner.

It is noteworthy that where a "predetermined" element is mentioned, it will be appreciated that this can include for example a configurable element, wherein the configuration can be done by any combination of a manual configuration by a user or administrator or a transmitted communication, for example from the network or from a service provider (e.g. a device manufacturer, an OS provider, etc.).

Techniques discussed herein can be implemented using a computer program product, comprising for example computer-readable instructions stored on a computer readable medium which can be executed by a computer, for carrying out a method according to the present disclosure. Such a computer readable medium may be a non-transitory computer-readable storage medium with an executable program stored thereon, wherein the program instructs a microprocessor to perform said method. Additionally, or alternatively, the techniques discussed herein may be realised at least in part by a computer readable communication medium that carries or communicates code in the form of instructions or data structures and that can be accessed, read, and/or executed by a computer.

In other words, any suitable computer readable medium may be used, which comprises instructions and which can for example be a transitory medium, such as a communication medium, or a non-transitory medium, such as a storage medium. Accordingly, a computer program product may be a non-transitory computer program product.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely examples of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Further examples of the present disclosure are set out in the following numbered clauses:

Clause 1. A method of operating a terminal in a mobile telecommunications system comprising a Non-Terrestrial Network "NTN", the network comprising a base station and the terminal, the terminal being configured to communicate with the base station via an air interface provided by infrastructure equipment of the NTN, the method comprising:

receiving a downlink transmission from the base station;

in response to the downlink transmission, transmitting an uplink transmission to the base station; and based on the uplink transmission and on a round trip time, determining whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 2. The method of Clause 1 further comprising, once it is determined that the terminal will enter a reduced power mode, the terminal reducing power consumption of the receiver during the time period.

Clause 3. The method of Clause 1 or 2 wherein the terminal reducing power consumption of the receiver during the time period comprises the UE not monitoring downlink transmissions during the time period.

Clause 4. The method of any preceding Clause wherein the determining is based on a downlink notification received from the base station and associated with the downlink transmission.

Clause 5. The method of Clause 4 wherein the downlink notification comprises one or more of: a notice that the terminal can enter a reduced power node; a start time for the time period; an end time for the time period and a duration for the time period.

Clause 6. The method of Clause 4 or 5, wherein the downlink notification is transmitted in one or more of:

downlink control information associated with the downlink transmission;

downlink control information scheduling the downlink transmission;

a control element of the downlink transmission; and a MAC control element of the downlink transmission.

Clause 7. The method of any preceding Clause further comprising:

receiving, from the base station, information identifying a first sleep period configuration; and identifying the time period based on the first sleep period configuration.

Clause 8. The method of any one of Clauses 1 to 6 further comprising:

receiving, from the base station, a set of two or more sleep period configurations and information identifying a first sleep period configuration of the set of two or more sleep period configurations; and identifying the time period based on the first sleep period configuration.

Clause 9. The method of Clause 8 wherein the set of two or more sleep period configurations is received via RRC signalling.

Clause 10. The method of any one of Clauses 7 to 9 wherein the information identifying the first sleep period configuration is transmitted in RRC signalling or in downlink control information associated with the downlink transmission.

Clause 11. The method of any preceding Clause, wherein the method further comprises, upon determining the time period, transmitting an uplink notification to the base station indicating that the terminal will enter a reduced power node.

Clause 12. The method of Clause 11 wherein the uplink notification comprises one or more of: a start time for the time period; an end time for the time period and a duration for the time period.

Clause 13. The method of Clause 11 or 12 comprising determining the time period based on a selected sleep period configuration, wherein the uplink notification comprises information identifying the selected sleep period configuration.

Clause 14. The method of any preceding Clause wherein the time for a signal to travel back and forth between the terminal and the base station comprises a flight time for the signal to travel from the terminal to base station and back from the base station to the terminal and, optionally, one or more of:

a processing delay, to be added, corresponding to an estimated processing time for the base station to process an incoming transmission from the terminal before responding to the terminal; and an early decoding time, to be deducted, corresponding to a time saving for the base station to decode an incoming transmission from the terminal early, before the incoming transmission is fully received by the base station.

Clause 15. The method of any preceding Clause wherein the time period has a duration corresponding to the round trip time or to half of the round trip time.

Clause 16. The method of any preceding Clause wherein the time period starts:

when the transmission of the uplink transmission ends; or after an intermediate time period has expired, the intermediate time period starting when the transmission of the uplink transmission ends.

Clause 17. The method of any preceding claim wherein the method comprises, when the terminal operates with a plurality of acknowledgement processes:

for each acknowledgement process of the plurality of acknowledgement processes, starting, after an uplink transmission associated with each acknowledgement process, an associated timer set to the round trip time;

when, for every one of the plurality of acknowledgement processes, the associated timer has started and has not expired, entering a reduced power mode;

when in reduced power mode and when a first timer associated with a first of the plurality of acknowledgement processes expires, exiting the reduced power mode.

Clause 18. The method of any preceding claim where one or more characteristics of the time period are determined by the base station and transmitted by the base station to the terminal.

Clause 19. The method of any preceding Clause wherein determining whether the terminal will enter the reduced power mode during a time period comprises determining whether the terminal is expecting a grant for an uplink transmissions and determining, if it is determined that the terminal is not expecting a grant for an uplink transmissions, that the terminal will enter the reduced power mode during a time period.

Clause 20. The method of Clause 19 further comprising: determining, if it is determined that the terminal is expecting a grant for an uplink transmissions, that the terminal will not enter the reduced power mode during a time period.

Clause 21. The method of Clause 19 further comprising: determining, if it is determined that the terminal is expecting a grant for an uplink transmissions, that the terminal will enter a second reduced power mode during a time period, wherein in the second reduced power mode the terminal is configured to monitor a downlink control channel for uplink grants only.

Clause 22. The method of any one of Clauses 19 to 21 wherein determining whether the terminal is expecting a grant for an uplink transmissions comprises one or more of:

determining that a buffer status of the terminal and for transmissions is greater than zero;

determining that the terminal has transmitted a Buffer Status Report "BSR" to the base station, the BSR indicating that buffered uplink data is present in a buffer of the terminal;

determining that the terminal has transmitted uplink data to the base station, wherein the transmitted uplink data has not been acknowledged by the base station; and determining that the terminal has transmitted a scheduling request to the base station.

Clause 23. A method of operating a base station in a mobile telecommunications system comprising a Non-Terrestrial Network "NTN", the network comprising the base station and a terminal configured to communicate with the base station via an air interface provided by infrastructure equipment of the NTN, the method comprising:

transmitting a downlink transmission to the terminal;

receiving, in response to the downlink transmission, an uplink transmission from the terminal; and making a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 24. The method of Clause 23 further comprising the base station, upon making the determination, identifying whether a further downlink transmission transmitted to the terminal would have been received during the time period; and If it is determined that the further downlink transmission was expected to be received by the terminal during the time period, disregarding the lack of response to the further downlink transmission in a communication configuration function of the base station.

Clause 25. A terminal for use in a mobile telecommunications system comprising a Non-Terrestrial Network "NTN", the network comprising a base station and the terminal, the terminal being configured to communicate with the base station via an air interface provided by infrastructure equipment of the NTN, and being further configured to:

receive a downlink transmission from the base station;

in response to the downlink transmission, transmit an uplink transmission to the base station; and based on the uplink transmission and on a round trip time, determine whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 26. The terminal of Clause 25 further configured to implement the method of any one of Clauses 2 to 22.

Clause 27. Circuitry for a terminal for use in a mobile telecommunications system comprising a Non-Terrestrial Network "NTN", the network comprising a base station and the terminal, wherein the circuitry comprises a controller element and a transceiver element configured to operate together to connect to the base station via an air interface provided by infrastructure equipment of the NTN, wherein the controller element and the transceiver element are further configured to operate together to:

receive a downlink transmission from the base station;

in response to the downlink transmission, transmit an uplink transmission to the base station; and based on the uplink transmission and on a round trip time, determine whether the terminal will enter a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 28. Circuitry for a terminal for use in a mobile telecommunications system comprising a Non-Terrestrial Network "NTN", the network comprising a base station and the terminal, wherein the circuitry comprises a controller element and a transceiver element configured to operate together to connect to the base station via an air interface provided by infrastructure equipment of the NTN, wherein the controller element and the transceiver element are further configured to operate together to implement the method of any one of Clauses 1 to 22.

Clause 29. A base station for use in a mobile telecommunications system comprising a Non-Terrestrial Network "NTN", the network comprising the base station and a terminal configured to communicate with the base station via an air interface provided by infrastructure equipment of the NTN, the base station being configured to:

transmit a downlink transmission to the terminal;

receive, in response to the downlink transmission, an uplink transmission from the terminal; and make a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 30. The base station of Clause 29 further configured to implement the method of Clause 24.

Clause 31. Circuitry for a base station for use in a mobile telecommunications system comprising a Non-Terrestrial Network "NTN", the network comprising the base station and a terminal, wherein the circuitry comprises a controller element and a transceiver element configured to operate together to connect to the terminal via an air interface provided by infrastructure equipment of the NTN, wherein the controller element and the transceiver element are further configured to operate together to transmit a downlink transmission to the terminal;

receive, in response to the downlink transmission, an uplink transmission from the terminal; and make a determination, based on a round trip time, that the terminal entered a reduced power mode during a time period, wherein the round trip time is a time for a signal to travel back and forth between the terminal and the base station and wherein, in the reduced power mode the terminal is configured to reduce a power consumption of at least a receiver of the terminal for communicating via the air interface.

Clause 32. Circuitry for a base station for use in a mobile telecommunications system comprising a Non-Terrestrial Network "NTN", the network comprising the base station and a terminal, wherein the circuitry comprises a controller element and a transceiver element configured to operate together to connect to the terminal via an air interface provided by infrastructure equipment of the NTN, wherein the controller element and the transceiver element are further configured to operate together to implement the method of Clause 23 or 24.

Clause 33. A system for use in a Non-Terrestrial Network "NTN", the system comprising a base station and a terminal configured to communicate with the base station via an air interface provided by infrastructure equipment of the NTN, wherein the base station is configured in accordance with Clause 29 or 30 and wherein the terminal is configured is configured in accordance with Clause 25 or 26.

REFERENCES

[1] TR 38.811, "Study on New Radio (NR) to support non terrestrial networks (Release 15)", 3rd Generation Partnership Project, September 2020.

[2] Holma H. and Toskala A, "LTE for UMTS OFDMA and SC-FDMA based radio access", John Wiley and Sons, 2009.

[3] TR 38.821, "Solutions for NR to support Non-Terrestrial Networks (NTN) (Release 16)", 3rd Generation Partnership Project, December 2019. R1-2005496, "UL Time and Frequency Synchronisation for NR-NTN" MediaTek, Eutelsat, RAN1#102e

The invention claimed is:

1. A method of operating a terminal, the method comprising:

receiving via a receiver of the terminal, via an air interface provided by infrastructure equipment of a Non-Terrestrial Network (NTN), a downlink transmission from a base station of the NTN;

in response to the downlink transmission, transmitting via a transmitter of the terminal an uplink transmission to the base station; and based on the uplink transmission and on a round trip time, determining whether the terminal will enter a reduced power mode during a time period, wherein the round trip time is a time for a signal to travel back and forth between the terminal and the base station, wherein, in the reduced power mode the terminal is configured to reduce a power consumption of the receiver of the terminal for communicating via the air interface, and wherein the time period has a duration corresponding to half of the round trip time.

2. The method of claim 1 further comprising:

upon determining that the terminal will enter the reduced power mode, reducing the power consumption of the receiver during the time period.

3. The method of claim 1, wherein the reduced power mode comprises not monitoring downlink transmissions by the receiver during the time period.

4. The method of claim 1, wherein the determining is based on receiving, from the base station, a downlink notification that is associated with the downlink transmission.

5. The method of claim 4. wherein the downlink notification comprises one or more of:

a notice that the terminal can enter a reduced power node;

a start time for the time period;

an end time for the time period, or a duration for the time period.

6. The method of claim 4, wherein the downlink notification is transmitted in one or more of:

downlink control information associated with the downlink transmission;

downlink control information scheduling the downlink transmission;

a control element of the downlink transmission; or a Medium Access Control (MAC) control element of the downlink transmission.

7. The method of claim 1, further comprising:

receiving, from the base station, information identifying a first sleep period configuration; and identifying the time period based on the first sleep period configuration.

8. The method of claim 1. further comprising:

receiving, from the base station, a set of two or more sleep period configurations and information identifying a first sleep period configuration of the set of two or more sleep period configurations; and identifying the time period based on the first sleep period configuration.

9. The method of claim 8, wherein the set of two or more sleep period configurations is received via radio resource control (RRC) signalling.

10. The method of claim 7, wherein the information identifying the first sleep period configuration is transmitted in the RRC signalling or in downlink control information associated with the downlink transmission.

11. The method of claim 1, wherein the method further comprises:

upon determining that the terminal will enter the reduced power mode during the time period, transmitting an uplink notification to the base station indicating that the terminal will enter the reduced power node.

12. The method of claim 11, wherein the uplink notification comprises one or more of:

a start time for the time period;

an end time for the time period, or a duration for the time period.

13. The method of claim 11, further comprising:

determining the time period based on a selected sleep period configuration, wherein the uplink notification comprises information identifying the selected sleep period configuration.

14. The method of claim 1, wherein the time for a signal to travel back and forth between the terminal and the base station comprises:

a flight time for the signal to travel from the terminal to base station and back from the base station to the terminal, or the flight time and one or more of:

a processing delay, to be added to the flight time, corresponding to an estimated processing time for the base station to process an incoming transmission from the terminal before responding to the terminal; or an early decoding time, to be deducted from the flight time, corresponding to a time saving for the base station to decode an incoming transmission from the terminal early, before the incoming transmission is fully received by the base station.

15. The method of claim 1, wherein the time period starts:

when the transmission of the uplink transmission ends; or after an intermediate time period has expired, the intermediate time period starting when the transmission of the uplink transmission ends.

16. The method of claim 1, wherein the method further comprises:

based on the terminal operating with a plurality of acknowledgement processes:

for each acknowledgement process of the plurality of acknowledgement processes, starting, after an uplink transmission associated with each acknowledgement process, an associated timer set to the round trip time;

based on, for every one of the plurality of acknowledgement processes, the associated timer having started and not having expired, entering the reduced power mode;

based on being in the reduced power mode and based on a first timer associated with a first of the plurality of acknowledgement processes expiring, exiting the reduced power mode.

17. The method of claim 1. wherein one or more characteristics of the time period are determined by the base station and transmitted by the base station to the terminal.

18. A terminal comprising:

control circuitry configured to:

control a receiver of the terminal to receive, via an air interface provided by infrastructure equipment of a Non-Terrestrial Network (NIN), a downlink transmission from a base station of the NTN;

in response to the downlink transmission, transmit via a transmitter of the terminal an uplink transmission to the base station; and based on the uplink transmission and on a round trip time, determine whether the terminal will enter a reduced power mode during a time period, wherein the round trip time is a time for a signal to travel back and forth between the terminal and the base station, wherein, in the reduced power mode the terminal is configured to reduce a power consumption of the receiver of the terminal for communicating via the air interface, and wherein the time period has a duration corresponding to half of the round trip time.

19. A non-transitory computer product containing instructions for a method of operating a terminal, the method comprising:

receiving via a receiver of the terminal, via an air interface provided by infrastructure equipment of a Non-Terrestrial Network (NTN), a downlink transmission from a base station of the NTN:

in response to the downlink transmission, transmitting via a transmitter of the terminal an uplink transmission to the base station; and based on the uplink transmission and on a round trip time, determining whether the terminal will enter a reduced power mode during a time period, wherein the round trip time is a time for a signal to travel back and forth between the terminal and the base station, wherein, in the reduced power mode the terminal is configured to reduce a power consumption of the receiver of the terminal for communicating via the air interface, and wherein the time period has a duration corresponding to half of the round trip time.

* * * * *